United States Patent
Khramov et al.

(10) Patent No.: US 12,454,639 B2
(45) Date of Patent: Oct. 28, 2025

(54) EMULSIFIER FOR SYNTHETIC-BASED MUD, PROCESS FOR PREPARATION, AND DRILLING METHOD

(71) Applicant: Schlumberger Technology Corporation, Sugar Land, TX (US)

(72) Inventors: Dimitri M. Khramov, Katy, TX (US); Evgeny Borisovich Barmatov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 282 days.

(21) Appl. No.: 18/028,283

(22) PCT Filed: Jan. 29, 2021

(86) PCT No.: PCT/US2021/015712
§ 371 (c)(1),
(2) Date: Mar. 24, 2023

(87) PCT Pub. No.: WO2022/066205
PCT Pub. Date: Mar. 31, 2022

(65) Prior Publication Data
US 2023/0374365 A1  Nov. 23, 2023

Related U.S. Application Data

(60) Provisional application No. 63/082,723, filed on Sep. 24, 2020.

(51) Int. Cl.
*C09K 8/36* (2006.01)
(52) U.S. Cl.
CPC ..................... *C09K 8/36* (2013.01)

(58) Field of Classification Search
None
See application file for complete search history.

(56) References Cited

U.S. PATENT DOCUMENTS

| | | | |
|---|---|---|---|
| 2,588,808 | A | 3/1952 | Dawson |
| 2,793,996 | A | 5/1957 | Lummus |

(Continued)

FOREIGN PATENT DOCUMENTS

| | | |
|---|---|---|
| CN | 104403646 A | 3/2015 |
| CN | 105441039 B | 5/2017 |

(Continued)

OTHER PUBLICATIONS

Extended Search Report issued in European Patent Application No. 21873100.8 dated Sep. 19, 2024, 7 pages.

(Continued)

*Primary Examiner* — Jeffrey D Washville
(74) *Attorney, Agent, or Firm* — Jeffrey D. Frantz

(57) ABSTRACT

Improved emulsifier for synthetic-based mud, process for preparation, and drilling method. The emulsifier has the formula (II) wherein each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5. It is prepared by reacting a polyalkyleneamine with a monocarboxylic acid to form a first reaction product, reacting the first reaction product with a dicarboxylic acid to form a second reaction product, and heat treating the second reaction product to form an isomer. The drilling fluid contains the emulsifier, an oleaginous phase, and a non-oleaginous phase, and during use is circulated in a wellbore.

24 Claims, 7 Drawing Sheets

(56) References Cited

U.S. PATENT DOCUMENTS

| | | |
|---|---|---|
| 2,816,073 A | 12/1957 | Stratton |
| 2,861,042 A | 11/1958 | Watkins |
| 2,876,197 A | 3/1959 | Watkins |
| 2,994,660 A | 8/1961 | Reddie |
| 2,999,063 A | 9/1961 | Hoeppel |
| 3,244,638 A | 4/1966 | Foley |
| 4,501,672 A * | 2/1985 | Connell .................. C09K 8/32 507/926 |
| 4,508,628 A † | 4/1985 | Walker |
| 4,544,756 A | 10/1985 | Patel |
| 4,658,036 A | 4/1987 | Schilling |
| 8,133,970 B2 | 3/2012 | Hurd et al. |
| 8,163,675 B2 † | 4/2012 | Navarrete |
| 8,765,644 B2 † | 7/2014 | Yu |
| 11,292,953 B2 † | 4/2022 | Steves |
| 2003/0130135 A1 | 7/2003 | Hou |
| 2008/0171671 A1 | 7/2008 | Mueller |
| 2015/0051120 A1 | 2/2015 | Hurd |
| 2017/0107418 A1* | 4/2017 | Zhou ....................... C09K 8/36 |
| 2017/0190945 A1 | 7/2017 | Chen et al. |
| 2017/0283680 A1 | 10/2017 | Chen et al. |
| 2018/0142134 A1 | 5/2018 | Zhou et al. |
| 2018/0142135 A1 | 5/2018 | Chen et al. |
| 2018/0194988 A1 | 7/2018 | Hilfiger et al. |
| 2021/0323909 A1 | 10/2021 | Khramov |

FOREIGN PATENT DOCUMENTS

| | | |
|---|---|---|
| EP | 0403437 A3 | 9/1991 |
| WO | 1989011516 A1 | 11/1989 |
| WO | WO8911516 A1 † | 11/1989 |
| WO | 2018125651 A1 | 7/2018 |
| WO | 2019028198 A1 | 2/2019 |
| WO | WO2022066205 A1 † | 3/2022 |

OTHER PUBLICATIONS

International Search Report and Written Opinion issued in International Patent application PCT/US2021/015712 on Jun. 18, 2021, 9 pages.

Zweifel et al., On the mechanism of anionic polymerization of maleic anhydride, 2, Die Makromolekulare Chemie, vol. 170, Issue 1, Jan. 1973, pp. 141-153.

Kour et al., Experimental and theoretical investigation of the reaction of secondary amines with maleic anhydride, Australian Journal of Chemistry, vol. 70, Issue 12, pp. 1247-1253, 2017.

Fann Instrument Company, FANN 35 Viscometer, Instruction Manual, 2016, 45 pages.

American Petroleum Institute, API Recommended Practice 13D, Rheology and Hydraulics of Oil-well Drilling Fluids, 7th Edition, Sep. 2017, 98 pages.

\* cited by examiner
† cited by third party

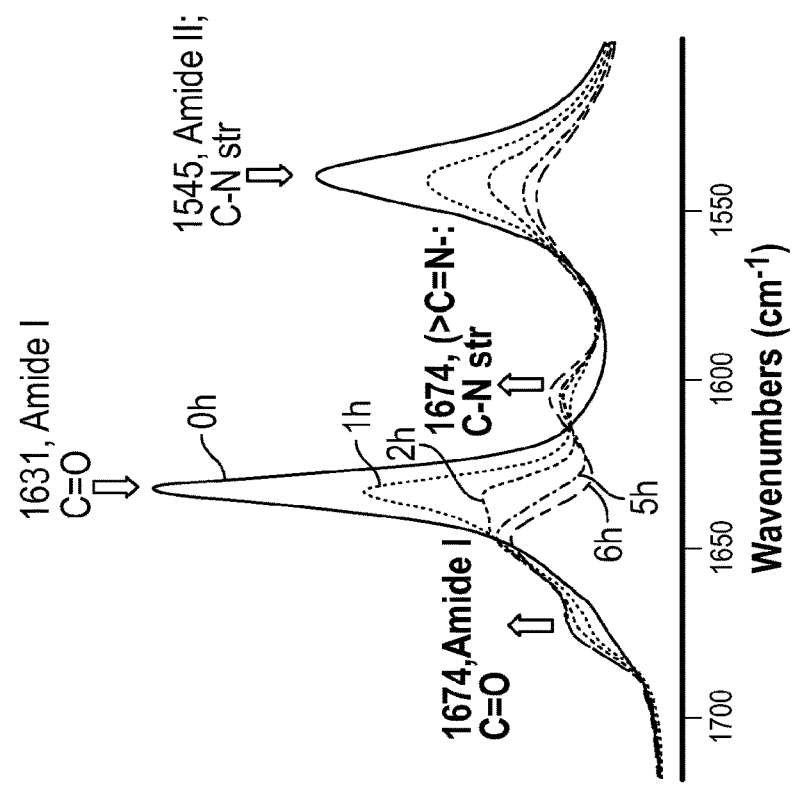
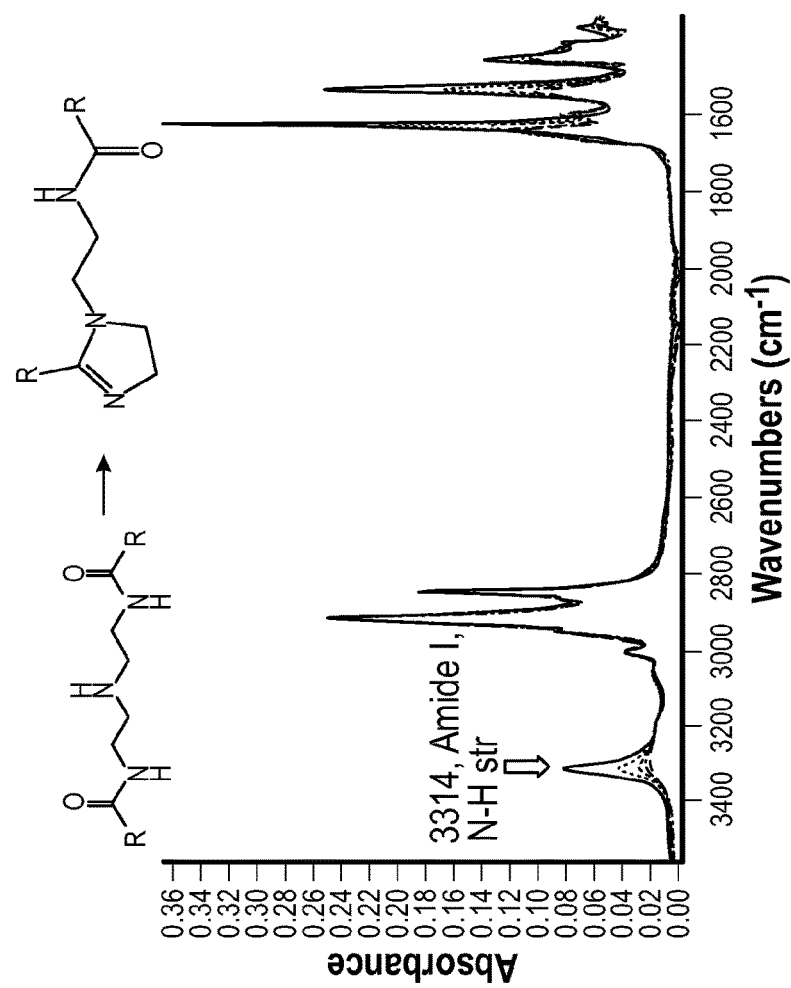
FIG. 2B
FIG. 2A

EMULSIFIER FOR SYNTHETIC-BASED MUD, PROCESS FOR PREPARATION, AND DRILLING METHOD

CROSS-REFERENCE PARAGRAPH

This application is the U.S. national phase of International Patent Application No PCT/US2021/015712, filed Jan. 29, 2021, and entitled "EMULSIFIER FOR SYNTHETIC-BASED MUD, PROCESS FOR PREPARATION, AND DRILLING METHOD", which claims the benefit of U.S. Provisional Application No. 63/082,723 entitled "Emulsifier for Drilling Fluids and Method of Preparation," filed Sep. 24, 2020, the disclosure of which are incorporated herein by reference in [its] their entirety.

BACKGROUND OF DISCLOSURE

Field of the Disclosure

Embodiments disclosed herein relate generally to emulsifier compositions, their preparation, and their use in drilling and drilling fluids.

Background

Invert drilling fluids are widely used since they minimize formation damage to water-sensitive clays by maintaining the oil in an external phase. Emulsifiers are used to stabilize the drilling fluids. Stability is often assayed using electrical stability (ES) as specified by the American Petroleum Institute at API Recommended Practice 13B-2, Third Edition (February 1998). In general, the higher the API ES voltage measured for the fluid, the more stable the emulsion is.

Some emulsifiers can adversely impact fluid rheology. Unstable rheology is an undesired fluid property in invert drilling fluids because increases in low shear rate viscosity (LSRV), for example, will increase effective circulation density (ECD) and may result in wellbore integrity issues. High gel strength is also undesirable because it can lead to increased surge pressure when mud pumps are restarted after a period of static condition and can result in difficulties with inserting or removing the drill string from the well after the well has been in static conditions for some time. Lowest absolute values for gels, and least change of gels when mud is subjected to thermal aging, are also preferred.

Commercially prepared emulsifiers are often contaminated with deleterious reaction by-products that can impact fluid performance and may require extensive purification. Furthermore, desirable emulsifiers often have unfavorable reaction kinetics, require difficult-to-maintain reaction conditions, or may require equipment not readily available in the art. Additionally, some emulsifiers may have poor physical properties, such as low- or slow-solubility in drilling fluids, making them difficult to formulate into a usable system for wellsite delivery and/or difficult to incorporate into a drilling fluid. Improved solubility of an emulsifier can ease formulation efforts in addition to improving the properties of the drilling mud.

The emulsifier used is the key to the stability of an invert emulsion fluid/mud (IEF). One of the most frequently used classes of emulsifiers is amidoamines. Amidoamines are highly effective in stabilizing invert emulsions and providing favorable rheological properties to an IEF. Many common amidoamines are based on the reaction of diethylenetriamine (DETA) or triethylenetetramine (TETA) with fatty acids and difunctional acids. The main reason for many emulsifiers available from DETA/TETA, fatty acid, and maleic anhydride is the perception that these emulsifiers perform differently. This difference in performance is achieved by adjusting reaction conditions and or raw material ratios. International publication number WO 89/11516 discloses an emulsifier that is made by first reacting a polyalkyleneamine such as diethylene triamine (DETA) with a tall oil fatty acid (TOFA), and then reacting the 2:1 bis-amide with maleic anhydride to introduce an N-substituted 4-oxobut-2-enoic acid group onto the internal amine and produce a compound of the following formula (A):

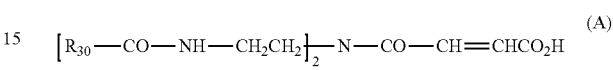

where $R_{30}$ is oleyl. However, if care is not taken during the synthesis of the bis-amide, a relatively large proportion of the corresponding imidazoline-amide (B) can be formed having the following general formula:

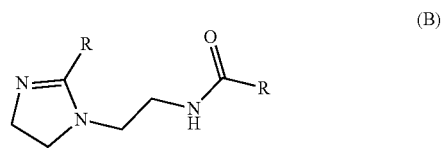

where R is alkyl. Moreover, when the bis-amide is precisely prepared and maleated to avoid the introduction of byproducts, the emulsifier represented by formula (A) has unsatisfactory emulsifying properties for use in an invert drilling mud, resulting in high fluid loss rates, high gel strength, and high LSRV, which worsens after hot rolling (AHR) and after static aging (ASA). Additionally, the high-purity form of the maleated bis-amide (A) has low solubility in base oil, making it difficult to use as a drilling fluid emulsifier.

The industry is ever in search of improved emulsifiers that address one or more problems noted above and minimize adverse impacts on the drilling fluid, as demonstrated by the following patent references: U.S. Pat. Nos. 2,876,197, 2,861,042, 2,793,996, 2,588,808, 2,816,073, 2,994,660, 2,999,063, 3,244,638, 4,508,628, 4,544,756, 4,658,036, 8,133,970, 8,163,675, US 20170190945, US20170283680, US20180142134, US 20180142135, US20180194988, EP0403437, WO2018/125651, WO2018/125651A1, and WO2019/028198.

SUMMARY OF CLAIMED SUBJECT MATTER

We have found that it is possible to create a very high performing emulsifier from conventional starting materials if the reaction conditions are properly selected. We have discovered, among other things, that the maleated bis-amide (A) per se disclosed in WO 89/11516 is not an effective emulsifier across the broad temperature ranges typically encountered in a drilling fluid. However, if the maleated bis-amide initially obtained is subjected to heat treatment, some of the 4-oxobut-2-enoic acid groups isomerize to an iso-amidoamine (C) such as 5-hydroxyfuran-2(5H)-one-5-yl-amine groups having the following formula:

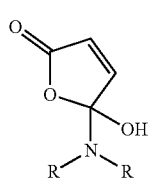

(C)

where each R is hydrocarbylamidoalkylene. We have also found that, whereas the directly maleated bis-amide is not universally effective at the high temperatures at which invert drilling fluids are commonly used, as evidenced by hot rolling results, the iso-amidoamine (C) is a highly effective emulsifier. However, heat treating can also result in cleaving some of the 4-oxobut-2-enoic acid groups to N-substituted formamide, which is not an effective emulsifier. Accordingly, by heat treating at appropriate conditions, one can obtain a highly effective emulsifier comprising the iso-amidoamine, free of significant deleterious byproducts, that solves and/or ameliorates the problems of the prior art. Furthermore, the quality of the emulsifier composition can be ascertained, and the heat treatment conditions can be monitored, by employing common methods in the art, such as, for example, acid number assay, amine number assay (e.g., as determined by non-aqueous titration), FTIR matching, viscometry, and the like.

In one aspect, embodiments disclosed herein relate to an emulsifier composition comprising an iso-amidoamine prepared by a process comprising the steps of: (1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof, to form a first reaction product comprising a polyalkyleneamidoamine derivative of the polyalkyleneamine, wherein the first reaction product comprises less than 30 mole percent imidazoline based on total moles of polyalkyleneamine derivatives in the first reaction product; (2) reacting the first reaction product from step (1) with a dicarboxylic acid selected from maleic acid, fumaric acid, maleic anhydride, and combinations thereof, to form a second reaction product comprising an acid-substituted amidoamine; and (3) heat treating the second reaction product from step (2) at a temperature and for a time sufficient to form a heat treatment product comprising an isomer of the acid-substituted amidoamine, wherein the heat treatment product has an acid number less than an acid number of the second reaction product.

In another aspect, embodiments disclosed herein relate to an emulsifier composition, comprising iso-amidoamine compound (II) or a mixture of iso-amidoamine compound (II) with acid-substituted amidoamine compound (I) and/or formyl-substituted amidoamine compound (III), according to the formulae:

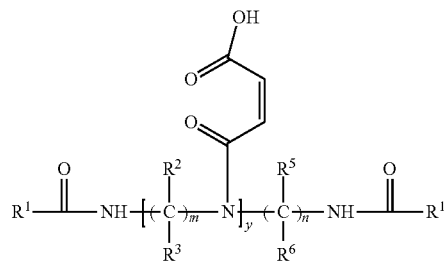

(I)

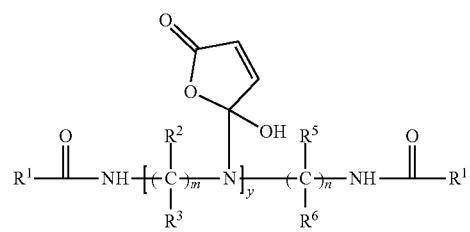

(II)

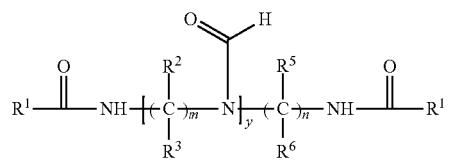

(III)

wherein each $R^1$ is a $C_4$ to $C_{30}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5.

In another aspect, embodiments disclosed herein relate to an invert drilling fluid. The drilling fluid comprises: (a) an oleaginous external phase; (b) a non-oleaginous internal phase; (c) an emulsifying amount of the iso-amidoamine of any embodiment disclosed herein; (d) optionally one or more rheology additives; and (e) optionally one or more wetting additives.

In yet another aspect, embodiments disclosed herein relate to a process for making an iso-amidoamine, comprising the steps of: (1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof, to form a first reaction product comprising a polyalkyleneamidoamine derivative of the polyalkyleneamine, wherein the first reaction product comprises less than 30 mole percent imidazoline based on total moles of polyalkyleneamine derivatives in the first reaction product; (2) reacting the first reaction product from step (1) with a dicarboxylic acid selected from maleic acid, fumaric acid, maleic anhydride, and combinations thereof, to form a second reaction product comprising an acid-substituted amidoamine; and (3) heat treating the second reaction product from step (2) at a temperature and for a time sufficient to form a heat treatment product comprising an isomer of the acid-substituted amidoamine, wherein the heat treatment product has an acid number less than an acid number of the second reaction product.

In a further aspect, embodiments disclosed herein relate to a process for drilling a well, comprising the steps of: (a) formulating an invert wellbore fluid comprising an oleaginous external phase, a non-oleaginous internal phase, an emulsifying amount of an iso-amidoamine according to any embodiment disclosed herein, one or more rheology additives, and one or more wetting additives; (b) circulating the invert wellbore fluid from step (a) in a wellbore; and (c) drilling the well while circulating the invert wellbore fluid in step (b).

Other aspects and advantages will be apparent from the following description and the appended claims.

BRIEF DESCRIPTION OF THE DRAWING FIGURES

FIG. 2A shows attenuated total reflection (ATR) Fourier transform infrared (FTIR) spectra of pure bis-amide prepared in the below examples and aged samples at 180° C. for 1-6 h used to differentiate imidazoline-amide and bis-amide in the reaction products according to embodiments disclosed herein.

FIG. 2B shows an enlarged portion of the ATR FTIR spectra of FIG. 2A over the wavenumbers from 1700 to 1500 $cm^{-1}$.

DETAILED DESCRIPTION

Figure 1:
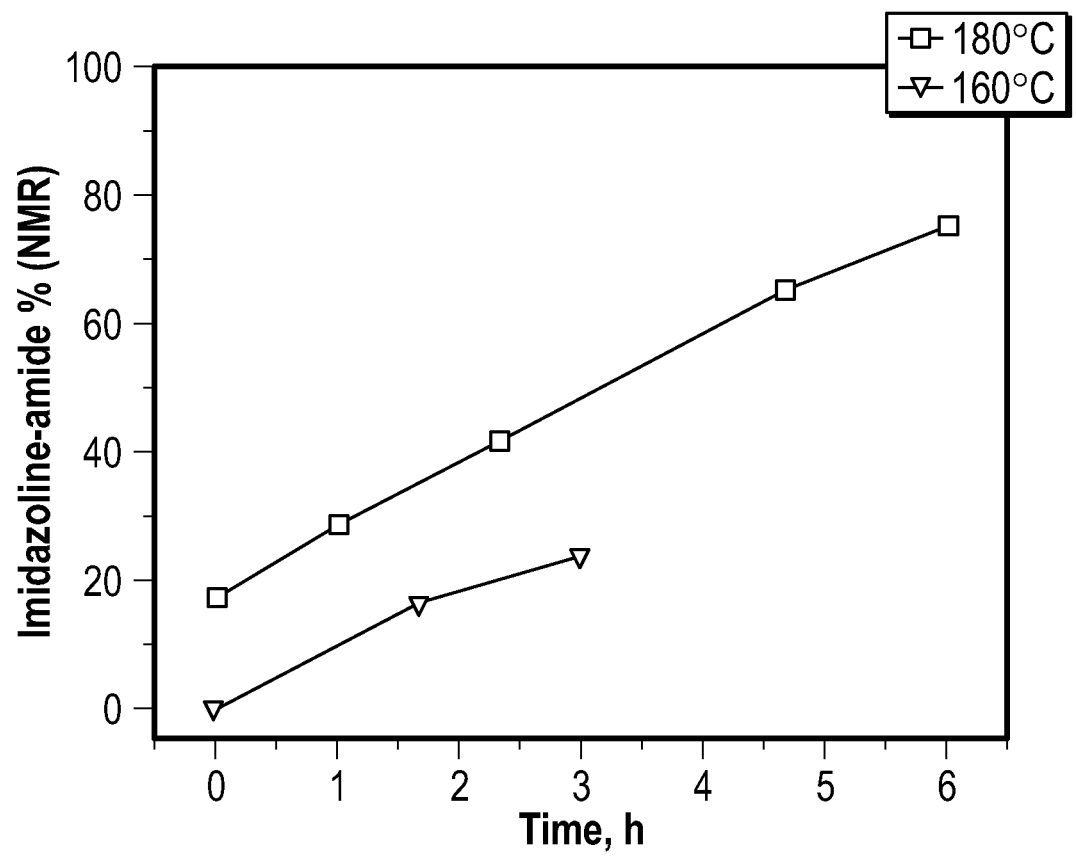
FIG. 1 shows conversion of bis-amide to imidazoline-amide during aging at 160° C. and 180° C. in an open reactor under nitrogen flow in the examples below for comparative purposes.

Descriptions and examples presented herein are solely for the purpose of illustrating preferred embodiments and should not be construed as limiting a scope of applications of this disclosure. While the compositions and processes are described herein as using certain process approaches or design elements, their actual realization could optionally comprise two or more different process approaches or design elements. In addition, the process approaches and design elements can also comprise some components other than the ones cited.

Throughout the entire specification, including the claims, the following terms shall have the indicated meanings. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any process or apparatus described herein can be comprised of, can consist of, or can consist essentially of any one or more of the described elements. Moreover, steps in a process may be carried out in any order and are not limited to the order in which they are listed.

As used in the specification and claims, the terms "about" and "approximately" are used interchangeably to mean plus or minus one-half of a significant digit unless the context implies otherwise. For example, "about 10" means plus-or-minus 5, i.e., from 5 to 15, whereas "about 10.0" means plus-or-minus 0.05, i.e., 9.95 to 10.05.

The terms "substituent," "radical," "group," and "moiety" may be used interchangeably.

As used herein, and unless otherwise specified, the term "Ce" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

The terms "hydrocarbyl radical," "hydrocarbyl," and "hydrocarbyl group" may be used interchangeably throughout this document. Likewise, the terms "group," "radical," and "substituent," may also be used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, where $R^*$ is hydrogen, alkyl, hydroxyalkyl, alkoxyalkyl, or carboxyalkyl, or where at least one heteroatom has been inserted within a hydrocarbyl ring.

As used herein, a "branched alkyl" refers to an alkyl group containing alkyl side chains (methyl, ethyl, propyl, butyl, etc.) on the carbon main chain.

As used herein, and unless otherwise specified, the term "alkyl" refers to a saturated hydrocarbon radical having from 1 to 30 carbon atoms (i.e., $C_1$-$C_{30}$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$, —$(CH_3)CHCH_2CH_3$, —$CH_2CH(CH_3)_2$, etc.).

As used herein, and unless otherwise specified, the term "alkylene" refers to a divalent alkyl moiety containing 1 to 30 carbon atoms (i.e., $C_1$-$C_{30}$ alkylene) in length and meaning the alkylene moiety is attached to the rest of the molecule at both ends of the alkyl unit. For example, alkylenes include but are not limited to —$CH_2$—, —$CH_2CH_2$—, —$H(CH_3)CH_2$—, —$CH_2CH_2CH_2$—, etc. The alkylene group may be linear or branched.

As used herein, and unless otherwise specified, the term "alkoxy" refers to —O— alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, "acid number" or "acid value" refers to the number of milligrams of potassium hydroxide equivalent to the acidity in 1 g of sample. Acid number is preferably determined by non-aqueous titration as described in WO2019/028198, which is hereby incorporated herein by reference.

As used herein, "amidoamine" refers to a compound having two or more secondary amide groups and at least one tertiary amine or amide group capped with a hydrophilic capping group such as $C_2$-$C_{12}$ dicarboxylic acid or anhydride, particularly maleic acid, fumaric acid, maleic anhydride, or the like.

As used herein, "amine number" or "amine value" refers to the number of milligrams of potassium hydroxide equivalent to the fatty amine basicity in 1 g of sample. Amine number is preferably determined by non-aqueous titration as described in WO2019/028198, which is hereby incorporated herein by reference.

As used herein, the terms "base oil" and "IO 1618 base oil" refer to a $C_{16}$-$C_{18}$ polyalphaolefin.

As used herein, "bis-amide" refers to a compound having two identical amide groups, whereas "polyamide" refers to a compound having two or more amide groups that can be the same or different.

As used herein, the term "closed reactor" refers to a reaction vessel in which the reactants and products are confined to an enclosed space, which can, if desired, include a recirculation loop.

As used herein, a "derivative" refers to a second molecule derived from a first molecule by substitution, condensation, hydration, isomerization, adduction, oligomerization, and so on, where the second molecule comprises at least a major portion of the first molecule. For purposes of determining the total moles of the derivative, derived molecules do not include the smaller cleavage or condensation molecules such as water, $CO_2$, acetylene, etc.

As used herein, a "dicarboxylic acid" refers to a substituted or unsubstituted hydrocarbyl containing two carboxylic acid moieties, or an anhydride thereof.

As used herein, the term "hydroxyl" refers to an —OH group.

As used herein, the term "imidazoline" refers to an imidazoline isomer or mixture of isomers (2-, 3-, and/or 4-imidazoline), or a compound comprising an imidazolinyl substituent.

As used herein, "iso-amidoamine" refers to an amidoamine in which the capping group is isomerized.

As used herein, a "monocarboxylic acid" refers to a substituted or unsubstituted hydrocarbyl containing one carboxylic acid moiety.

As used herein, the prefix "poly-" refers to more than one, i.e., two or more.

As used herein, the term "polyalkyleneamine" refers to a compound having alternating amine and alkylene groups. The polyalkyleneamine can be linear or branched. Branched polyalkyleneamines can have branched alkylene groups or can be branched via a tertiary amine.

As used herein, the term "polyalkyleneamidoamine" refers to a compound having two or more alkylene moieties, two or more amide groups, and at least one additional nitrogen heteroatom, which can form or be part of an amine, amide, or imide group. For example, a polyalkyleneamidoamine can be derived from a polyalkyleneamine by reaction with a monocarboxylic acid, which may be saturated or unsaturated.

As used herein, "tall oil fatty acid" or "TOFA" is the distillate fraction of tall oil consisting mostly of oleic acid.

As used herein, the viscosity of an emulsifier is determined at 50° C. at 50% dilution in an IO 1618 base oil (INEOS Oligomers) or equivalent, e.g., an isomerized $C_{16}$-$C_{18}$ alpha olefin having the following properties: Carbon Number, wt % (by GC): $C_{14}$: 1; $C_{16}$: 57; $C_{18}$: 37; $C_{20}$: 5; Hydrocarbon Type, wt % (by GC), Monoolefin: 99.2, Paraffin 0.8; Olefin Isomers, mole % by (NMR): Linear terminal: 61, Branched terminal: 32, Linear internal olefins: 7; Other Properties: Color, APHA 5; Density at 20° C., g/mL 0.787; Density at 68° F., lbs/gal 6.57; Pour Point, ° C. 2; Flash Point, ° C., (ASTM D 93) 135; Boiling Range, ° C., (5%-95%) 285-316.

The following abbreviations are used herein: 2D, two-dimensional; AHR, after hot rolling; API, American Petroleum Institute; ASA, after static aging; ASTM, ASTM International, formerly known as American Society for Testing and Materials; ATR, attenuated total reflection; bbl, 42-gallon barrel; DETA, diethylene tetramine; ECD, effective circulation density; ES, electrical stability; HMBC, heteronuclear multiple bond correlation; HSQC, heteronuclear single quantum spectroscopy; IEF, invert emulsion fluid/mud; FTIR, Fourier transform infrared spectroscopy; HTHP, high temperature, high pressure filtration; LC, liquid chromatography; LSRV, low shear rate viscosity; MAH, maleic anhydride; MS, mass spectrometry; NAF, non-aqueous fluid; NMR, nuclear magnetic resonance; OBM, oil base mud; PEHA, pentaethylene hexamine; SBM, synthetic base mud; TEPA, tetraethylene pentamine; TETA, triethylene tetramine; TOCSY, total correlation spectroscopy; TOFA, tall oil fatty acid; ° VG, FANN 35 viscometer gauge.

In one aspect, the disclosure herein is embodied by an emulsifier composition prepared by a process comprising the steps of:

(1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof (preferably the monocarboxylic acid), to form a first reaction product comprising a polyalkyleneamidoamine derivative of the polyalkyleneamine;

(2) reacting the first reaction product from step (1) with a dicarboxylic acid selected from maleic acid, fumaric acid, maleic anhydride, and combinations thereof to form a second reaction product an acid-substituted amidoamine; and (3) heat treating the acid-substituted amidoamine from step (2) at a temperature and for a time sufficient to form a heat treatment product comprising an isomer of the acid-substituted amidoamine, wherein the heat treatment product has an acid number less than an acid number of the second reaction product.

In any embodiment, the polyalkyleneamine in step (1) can have the formula

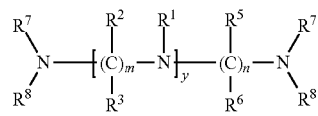

where $R^1$, $R^7$, and $R^8$ are hydrogen; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are an integers from 1 to 10; and y is an integer from 1 to 5; preferably wherein the polyalkyleneamine is selected from the group consisting of diethylenetriamine (DETA), triethylenetetramine (TETA), tetraethylene pentamine (PETA), pentaethylenehexamine (PEHA), and combinations thereof, more preferably the polyalkyleneamine is DETA.

In any embodiment, the monocarboxylic acid in step (1) can be any low-melting and/or unsaturated fatty acid. In any embodiment, the monocarboxylic acid in step (1) is preferably tall oil fatty acid (TOFA), stearic acid, oleic acid, linoleic acid, or a combination thereof. If desired, the monocarboxylic acid can be branched, such as, for example, isostearic acid.

In any embodiment, the polyalkyleneamidoamine derivative from step (1) can have the formula:

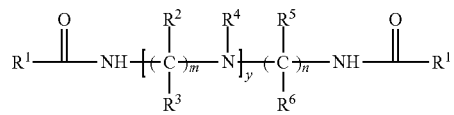

where each $R^1$ is a $C_4$ to $C_{30}$ hydrocarbyl, preferably a $C_{16}$-$C_{18}$ hydrocarbyl, more preferably a branched $C_{18}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; $R^4$ is hydrogen; n and m are independently integers from 1 to 10; and y is an integer from 1 to 5. Preferably $R^2$, $R^3$, $R^5$, and $R^6$ are hydrogen, m and n are 2, and y is 1.

In any embodiment, step (1) can comprise contacting the polyalkyleneamine and the monocarboxylic acid at approximately 110-140° C. in a closed reactor, to control removal of water formed from amide condensation, and to control imidazoline formation to less than 30%, preferably less than 20%, e.g., 5 to 30% or 10 to 20%, based on the total moles of the polyalkyleneamine, the polyalkyleneamidoamine derivative, and the imidazoline in the first reaction product. More preferably, step (1) further comprises cooling the closed reactor and then opening the cooled reactor to remove water In any embodiment, a reaction mixture in step (1) can comprise a molar ratio of the polyalkyleneamine and the monocarboxylic acid at from 1:1.2 to 1:2.8, preferably from 1:1.6 to 1:2.4, more preferably from 1:1.8 to 1:2.2, and especially about 1:2.

In any embodiment, the acid-substituted amidoamine from step (2) can be a compound (I) according to the formula:

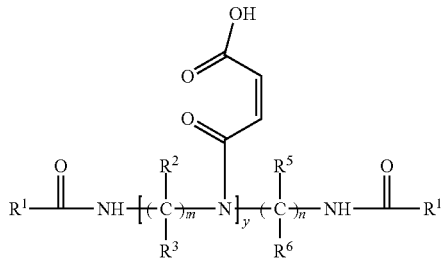

(I)

where each $R^1$ is a $C_4$ to $C_{30}$ hydrocarbyl, preferably a $C_{16}$-$C_{18}$ hydrocarbyl, more preferably a branched $C_{18}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; m and n are integers from 1 to 10; and y is an integer from 1 to 5; preferably wherein $R^2$, $R^3$, $R^5$, and $R^6$ are hydrogen, m and n are 2, and y is 1.

In any embodiment, step (2) can be conducted at approximately 70-100° C., for about 0.5-2 h.

In any embodiment, a reaction mixture in step (2) can comprise a molar ratio of the polyalkyleneamidoamine derivative and the dicarboxylic acid from 1:0.8 to 1:1.2, preferably about 1:1.

In any embodiment, the heat treatment in step (3) can be conducted at a temperature above 140° C. and/or for a period of time greater than 2 hours, preferably less than 8 hours, more preferably approximately 150-170° C. for 2 to 4 hours. In general, higher temperatures require less time and longer times can be used at lower temperatures.

In any embodiment, the heat treatment product of step (3) can be controlled for an acid number less than 35 mg KOH/gram, preferably less than 25 mg KOH/gram, amine number less than 10 mg KOH/gram, and a viscosity of less than 800 centipoise (preferably 400-600 cp) at 50° C. when measured at a dilution of 50 wt % in an IO 1618 base oil. Higher acid numbers indicate insufficient conversion to the isomer. The amine number in the product is theoretically zero, but this is difficult to reach as a practical matter. Higher viscosities generally indicate the starting material ratios were off and/or polymerization, such as, for example, when the iodine value of TOFA is too high or too much linoleic/linolenic is used. A high-viscosity product can still work as an emulsifier, but it can be inconvenient or difficult to use on location in the field.

In any embodiment, the emulsifier composition can comprise about 30-80 wt % of the heat treatment product from step (3) and about 70-20 wt % of one or more other components. Preferably, the one or more other components can comprise a hydrocarbyl ethoxylate having the formula RO—$(CH_2CH_2O)_n$H wherein R is a $C_{5-22}$ (preferably $C_{16-22}$) hydrocarbyl group and n is an integer in the range of 2 to 30.

In another aspect, the disclosure herein is embodied by an emulsifier composition comprising iso-amidoamine compound (II) and/or a mixture of iso-amidoamine compound (II) with acid-substituted amidoamine compound (I) and/or formyl-substituted amidoamine compound (III), according to the formulae:

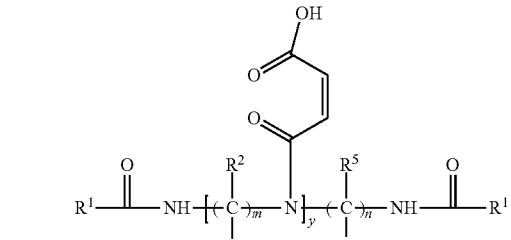

(I)

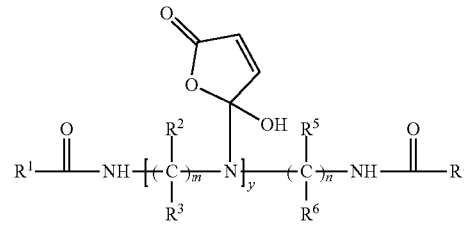

(II)

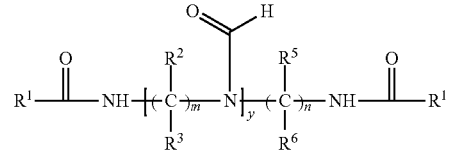

(III)

wherein each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5.

In any embodiment, molar proportions of compounds (I), (II), and (III), can be 0-90:10-100:0-60, preferably 0-90:10-40:0-60, and more preferably 10-90:20-40:10-60, based on the total moles of compounds (I), (II), and (III), present in the emulsifier composition.

In another aspect, the disclosure herein is embodied by an invert drilling fluid, comprising (a) an oleaginous external phase; (b) a non-oleaginous internal phase; (c) the emulsifier of any embodiment disclosed herein; (d) optionally one or more rheology additives; and (e) optionally one or more wetting additives. Preferably, the formulated emulsifier is present in the invert drilling fluid in an amount of from 1.5 to 20 lb of the emulsifier composition per bbl of invert drilling fluid, more preferably about 6-12 lb/bbl.

In any embodiment, the invert drilling fluid can further comprise a wetting additive comprising a hydrocarbyl ethoxylate having the formula RO—$(CH_2CH_2O)_n$H wherein R is a $C_{5-22}$ hydrocarbyl group (preferably oleyl) and n is an integer in the range of 2 to 30, preferably at 0.5 to 8 lb alkyl ethoxylate per bbl of invert drilling fluid.

In another aspect, the disclosure herein is embodied by a process for making and/or using an emulsifier, comprising the steps of:
 (1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof (preferably the monocarboxylic acid), to form a first reaction product comprising a polyalkyleneamidoamine derivative of the polyalkyleneamine;
 (2) reacting the first reaction product from step (1) with a dicarboxylic acid selected from maleic acid, fumaric acid, maleic anhydride, and combinations thereof to form a second reaction product an acid-substituted amidoamine; and (3) heat treating the maleated amidoamine from step (2) at a temperature and for a time sufficient to form a heat treatment product comprising an isomer of the acid-substituted amidoamine, wherein the heat treatment product has an acid number less than an acid number of the second reaction product.

In any embodiment of the process, the polyalkyleneamine in step (1) can have the formula

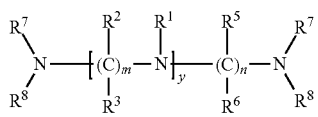

where $R^1$, $R^7$, and $R^8$ are hydrogen; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are an integers from 1 to 10; and y is an integer from 1 to 5; preferably wherein the polyalkyleneamine is selected from the group consisting of diethylenetriamine (DETA), triethylenetetramine (TETA), tetraethylene pentamine (PETA), pentaethylenehexamine (PEHA), and combinations thereof, more preferably the polyalkyleneamine is DETA.

In any embodiment of the process, the monocarboxylic acid is preferably tall oil fatty acid (TOFA), stearic acid, oleic acid, linoleic acid, isostearic acid, or a combination thereof, and the dicarboxylic acid is preferably maleic anhydride.

In any embodiment of the process, the polyalkyleneamidoamine derivative from step (1) can have the formula:

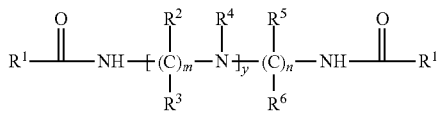

where each $R^1$ is a $C_4$ to $C_{30}$ hydrocarbyl, preferably a $C_{16}$-$C_{18}$ hydrocarbyl, more preferably a branched $C_{18}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; $R^4$ is hydrogen; n and m are independently integers from 1 to 10; and y is an integer from 1 to 5. Preferably, $R^2$, $R^3$, $R^5$, and $R^6$ are hydrogen, and m and n are 2.

In any embodiment of the process, step (1) can comprise contacting the polyalkyleneamine and the monocarboxylic acid at approximately 110-140° C. in a closed reactor, to control removal of water formed from amide condensation, and to control imidazoline formation to less than 30%, based on the total moles of the polyalkyleneamine, the polyalkyleneamidoamine derivative, and the imidazoline in the first reaction product. More preferably, step (1) further comprises cooling the closed reactor and then opening the cooled reactor to remove water.

In any embodiment of the process, a reaction mixture in step (1) can comprise a molar ratio of the polyalkyleneamine and the monocarboxylic acid at from 1:1.2 to 1:2.8, preferably from 1:1.6 to 1:2.4, more preferably from 1:1.8 to 1:2.2, and especially at about 1:2.

In any embodiment of the process, the acid-substituted amidoamine from step (2) can be a compound (I) according to the formula:

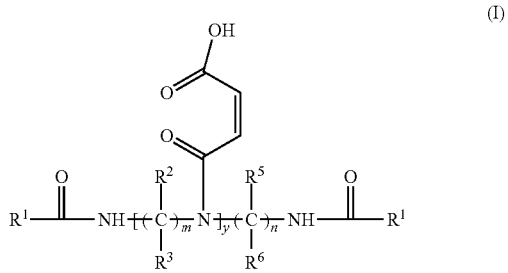

where each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; m and n are integers from 1 to 10; and y is an integer from 1 to 5.

In any embodiment of the process, step (2) can comprise contacting the first reaction product and the dicarboxylic acid at approximately 70-100° C., for about 0.5-2 h, preferably wherein a molar ratio of the polyalkyleneamidoamine derivative and the dicarboxylic acid is from 1:0.8 to 1:1.2.

In any embodiment of the process, the heat treatment in step (3) can be conducted at a temperature above 140° C. and/or for a period of time greater than 2 hours, preferably approximately 150-170° C. for 2 to 4 hours.

In any embodiment of the process, the heat treatment in step (3) is preferably controlled wherein the heat treatment product has an acid number less than 35 mg KOH/gram, preferably less than 25 mg KOH/gram, an amine number less than 10 mg KOH/gram, and a viscosity of less than 800 centipoise at 50° C. when measured at a dilution of 50 wt % in an IO1618 base oil.

In any embodiment of the process, the heat treatment product from step (3) can comprise iso-amidoamine compound II or a mixture of iso-amidoamine compound (II) with acid-substituted amidoamine compound (I) and/or formyl-substituted amidoamine compound (III), according to the formulae:

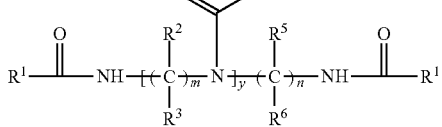

(I)

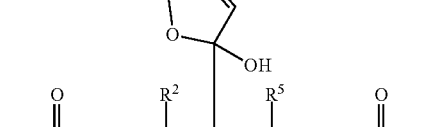

(II)

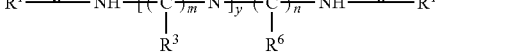
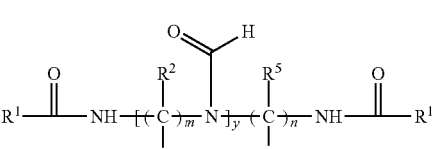

(III)

wherein each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5; and wherein molar proportions of compounds (I), (II), and (III), are optionally 0-90:10-100:0-60, and preferably 0-90:10-40:0-60, based on the total moles of compounds (I), (II), and (III), present in the emulsifier composition.

In any embodiment of the process, the heat treatment product from step (3) can be formulated at about 30-80 wt % of the heat treatment product with about 70-20 wt % of one or more other components. Preferably, the one or more other components can comprise a hydrocarbyl ethoxylate having the formula RO—$(CH_2CH_2O)_n$H wherein R is a $C_{5-22}$ (preferably $C_{16-22}$) hydrocarbyl group and n is an integer in the range of 2 to 30.

In another aspect, the disclosure herein is embodied by a process for preparing an invert wellbore fluid, comprising the steps of: (A) making an emulsifier composition according to any embodiment disclosed herein; and (B) formulating the emulsifier composition in an emulsifying amount in an invert wellbore fluid further comprising an oleaginous external phase, a non-oleaginous internal phase, one or more rheology additives, and one or more wetting additives. The process can further comprise the steps of: (C) circulating the invert wellbore fluid from step (B) in a wellbore, and/or (D) drilling the well while circulating the invert wellbore fluid in step (C).

In another aspect, the disclosure herein is embodied by a process for drilling a well, comprising the steps of: (a) formulating an invert wellbore fluid comprising an oleaginous external phase, a non-oleaginous internal phase, an emulsifier composition according to any embodiment disclosed herein, one or more rheology additives, and one or more wetting additives; (b) circulating the invert wellbore fluid from step (a) in a wellbore; and (c) drilling the well while circulating the invert wellbore fluid in step (b).

The following description is directed to DETA as the polyalkyleneamine, TOFA as the monocarboxylic acid, and maleic anhydride as the dicarboxylic acid, by way of example and not limitation, for the purposes of illustration and clarity, with the understanding that other polyalkyleneamines, monocarboxylic acids, and dicarboxylic acids may be suitable.

The present invention discloses drilling fluid compositions and emulsifier compositions having the general formula II and/or a mixture of I, II and III, and a method for manufacturing the same:

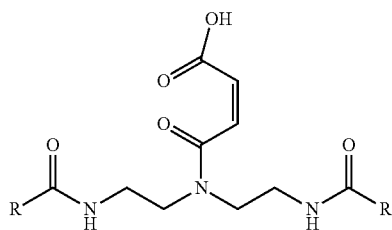

I

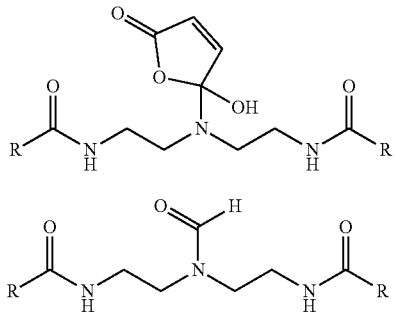

II

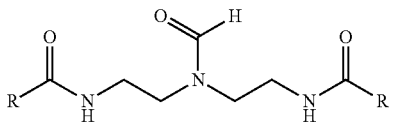

III

The active emulsifier composition is the iso-amidoamine (II), which could be employed in a pure form, however, as a practical matter, the emulsifier composition generally comprises a mixture of the precursor acid-substituted amidoamine (structure I), iso-amidoamine (structure II) and formyl-substituted amidoamine (structure III) with varying ratios between structures I, II and III. The mixture is preferred because it is readily prepared using available oilfield chemical synthesis equipment and techniques, and functions effectively without purification. The composition of the emulsifier is controlled by the reaction conditions.

The emulsifier can be produced by a three-step reaction process. We determined the appropriate reaction conditions and quality control methods of the intermediates and final composition that are desirable to create a highly efficient emulsifier using conventional raw materials:

Step 1: Reaction between polyamine, e.g., DETA, and fatty acid, e.g., TOFA, to create a bis-amide intermediate. The ratio between DETA and TOFA is preferably 1:1.8 to 1:2.2, more preferably about 1:2. The molar proportion of the byproduct imidazoline-amide in the first reaction product, should be less than 30%, preferably less than 20%, e.g., 5-30% or 10-20%, based on the total moles of unreacted DETA, bis-amide, and imidazoline-amide in the first reaction product, to avoid unproductive reaction pathways during the second step. The quality of bis-amide is desirably controlled by FTIR and $^1$H NMR spectroscopy matching methods illustrated in the examples below.

Step 2: Maleation of the intermediate, i.e., the bis-amide from step 1, with maleic anhydride. Intermediate compound (I) is the primary product of the step 2 reaction. The reaction between bis-amide and maleic anhydride is generally carried out under stoichiometric conditions. The second step is preferably carried out at temperature between 70 and 100° C., more preferably between 80 and 90° C. for about 0.5-2 h.

Step 3: Heat-treatment of the maleated intermediate (structure I) at a temperature greater than 140° C. and/or for a time greater than 2 h, preferably 140 to 180° C., more preferably about 150-170° C., preferably about 2-8 h, more preferably for 2-4 h, and/or until desired properties of the emulsifier are reached. The heat treatment causes isomerization of the acid-substituted amidoamine (I) to the iso-amidoamine (II), and also conversion of (I) and/or (II) to the formyl-substituted amidoamine (III). Structure (I) is not sufficiently effective by itself, whereas structure (III) may detract from the performance of (I) and/or (II). The performance of the emulsifier in an OBM thus depends on ratio of structures (I), (II) and (III), i.e., the composition of the emulsifier, preferably structures (I), (II). The quality of the emulsifier can be controlled by FTIR spectroscopy, amine number assay, acid number assay, and/or Brookfield viscosity, as illustrated in the examples below.

When we precisely synthesized and confirmed structure (I) by NMR, FTIR and MS in Example 1 below, we found that high quality acid-substituted amidoamine (I) is insoluble in base oil and its performance as an emulsifier in a formulated drilling fluid at 325° F. was unacceptable. Therefore, the entire pathway to create a high-performing emulsifier as disclosed in WO 89/11516 was brought into question. The general conclusion of the analysis of high-quality acid-substituted amidoamine (I) showed that obtaining a very pure emulsifier (I) is not necessary for good performance in a formulated drilling fluid.

We then discovered that performance of the emulsifier composition can be significantly improved if emulsifier (I) is heated, in other words, when the preparation method introduces an additional heating step (Step 3) into the emulsifier synthesis procedure. The synthesis of an exemplary thermally-aged emulsifier (II) using a commercial-type process is shown in Example 3 below. Aged emulsifier (II) has improved performance in a typical oil-based drilling fluid formulation, at temperatures at least up to 325° F., thus making this class of surfactant acceptable based on the requirements of high temperature applications.

The effect of heat-treatment conditions (T, time) on the performance of the thermally aged emulsifier in a typical oil-based drilling fluid formulation is shown in Examples 3 and 4 below. A series of emulsifiers was synthesized in Example 3 under controlled heat-treatment conditions, i.e., the aging temperature varied from 130 to 210° C., and the aging time was constant, i.e., 4 hrs. OBM properties using the commercial benchmark emulsifier of structure (I) without heat treatment as a baseline reference, and developmental emulsifiers, were tested at 325° F. after 16 hours hot roll (AHR) and then after 7-day static test (ASA). In general, we concluded that an emulsifier produced at 160° C. shows the best performance, and an increase in the temperature of the third step leads to an increase in the fluid loss, 10-min gel and LSRV, i.e., worsens its properties, presumably due to excessive conversion to the formyl-substituted amidoamine (III).

In Example 4, we evaluated the conditions of the third step at the preferred temperature shown in Example 3 (160° C.), but over time periods of 2, 4, 6, 16 and 24 h, and determined that 2-4 h produced the best OBM performance. The emulsifier of the disclosure produced via the three-step synthesis procedure was highly effective in a typical oil-based drilling fluid formulation. An additional benefit of the thermal treatment of product (I) is improved physical properties. Product (I) in its pure state (Example 1) was a waxy solid and oil insoluble, difficult to formulate into a usable system for wellsite delivery and difficult to incorporate into a drilling fluid. The heat-treatment regime (step 3) improved solubility of the emulsifier for ease of formulation efforts in addition to improving the properties of the drilling mud.

To elucidate the chemical transformation that occurs during amidoamine synthesis, synthesis of modelling compounds was used to identify thermal degradation products/mechanism and preferred synthesis conditions. The mechanism of the three-step reaction approach to amidoamine emulsifier is shown in Scheme 1:

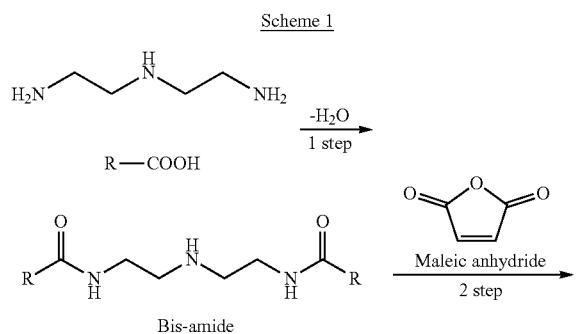

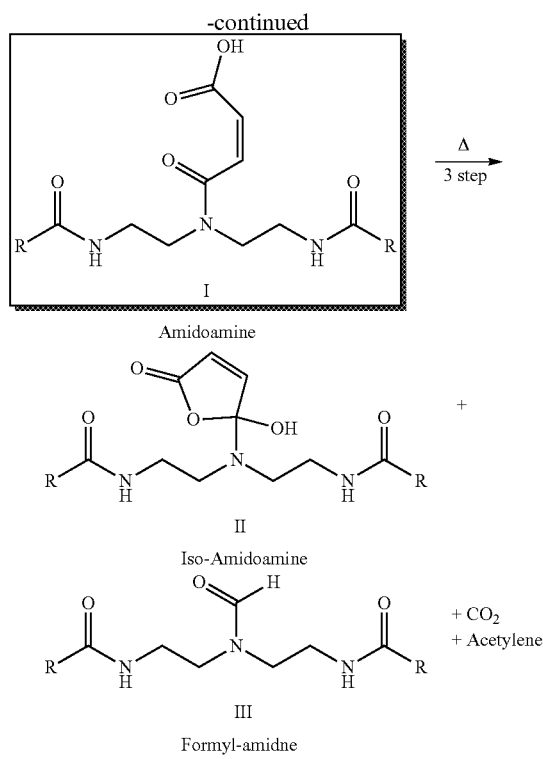

Analysis of model reactions (Example 5) suggested that the main components of aged emulsifier are: acid-substituted amidoamine (I), isomer of N-substituted maleimic acid (II), and N,N-disubstituted formamide (III), as illustrated in Scheme 1.

The ratio between components in the emulsifier composition was found to depend on heat treatment conditions (temperature and time). The contribution of each component into performance of the emulsifier in an oil-based drilling fluid formulation can also be different. As Example 1 shows, the properties of the pure acid-substituted amidoamine (I) are not acceptable for high temperature drilling fluids. Independent synthesis of product (III) in Example 6 below via reaction of bis-amide and ammonium formate has also shown that the pure N-formyl amidoamine (III) also has performance issues. In this regard, we have established that the main active component of the heat-treated DETA-TOFA-MA emulsifier is the cyclic product of amidoamine (I) isomerization, i.e., iso-amidoamine (II), which is spontaneously formed at an elevated temperature. Although not wishing to be bound by any theory, we postulate that initially intermediate (I) converts to (II) and then (I and II) convert to (III). This means that the reaction needs to be heated sufficiently well after the maleation step (Step 2) to affect transformation into (II) but not over-heated, at too high a temperature and/or for too long, to predominantly produce (III).

It was previously recognized in WO 89/11516 that the quality of the first stage reaction product of DETA-TOFA is essential and the bis-amide intermediate should allegedly be free of any imidazoline by-product, which can be formed as shown in reaction Scheme 2.

Scheme 2

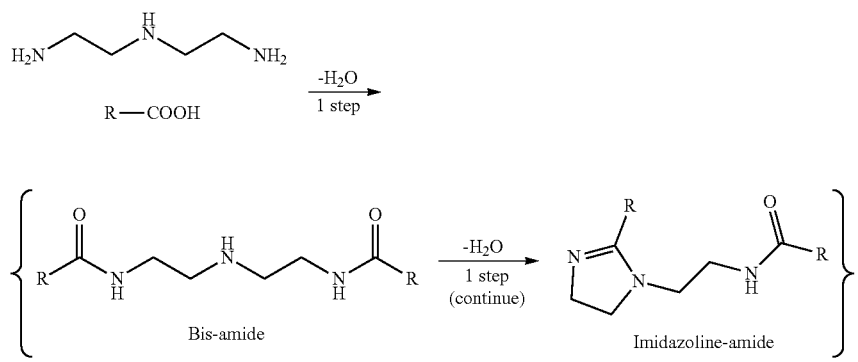

Example 8 below shows that bis-amide and imidazoline are not effective emulsifiers. However, unlike previous work in this area, the concentration of imidazoline in the present disclosure is considered acceptable if it does not exceed 30%, and preferably does not exceed 20%, based on the total moles of unreacted polyamine, bis-amide and imidazoline in the reaction products from step 1. This discovery allows some flexibility in the production methods and the selection of process conditions used in step 1, that can result by allowing the formation of say 5-10% imidazoline in step 1. The bis-amide is the reaction product of two equivalents of fatty acid with one equivalent of DETA. Water is generated as the co-product and is removed to drive the reaction towards completion. The main impurities formed in this reaction are imidazolines. Control of bis-amide to imidazoline illustrated in Scheme 2 is difficult under lab-scale and industrial conditions, as shown in Example 2-1 below.

The theoretical stochiometric ratio to create amidoamine (I) is 2 moles of TOFA, 1 mole of DETA, and 1 mole of maleic anhydride (MAH). Alternate ratios can be used, provided the material does not become too viscous, e.g., the emulsifier should preferably have a viscosity of less than 800 centipoise at 50° C. when measured at a dilution of 50 wt. % in a base oil, preferably 400-600 cp. Since the TOFA composition is variable because it is a naturally sourced product, the proper ratio can be described in terms of acid numbers and amine numbers. Therefore, enough TOFA needs to be added so that the acid groups account for 66% of the amine value of DETA. Example 7 below shows what happens when the ratio of TOFA:DETA is different from the stoichiometric 2 to 1 ratio. We decreased the amount of TOFA added during the synthesis of the bis-amide intermediate. We dropped or decreased the TOFA amount by 0.2 moles (DETA:TOFA:MA=1:1.8:1) and by 0.4 moles (DETA:TOFA:MA=1:1.6:1). The emulsifier with different DETA:TOFA ratios was prepared according to the method described in Example 2-1 (step 1, method C). The first step synthesis resulted in formation of a blend of bis-amide (3), mono-amide (4), and imidazole (see Scheme 2) as shown in Scheme 3:

Scheme 3

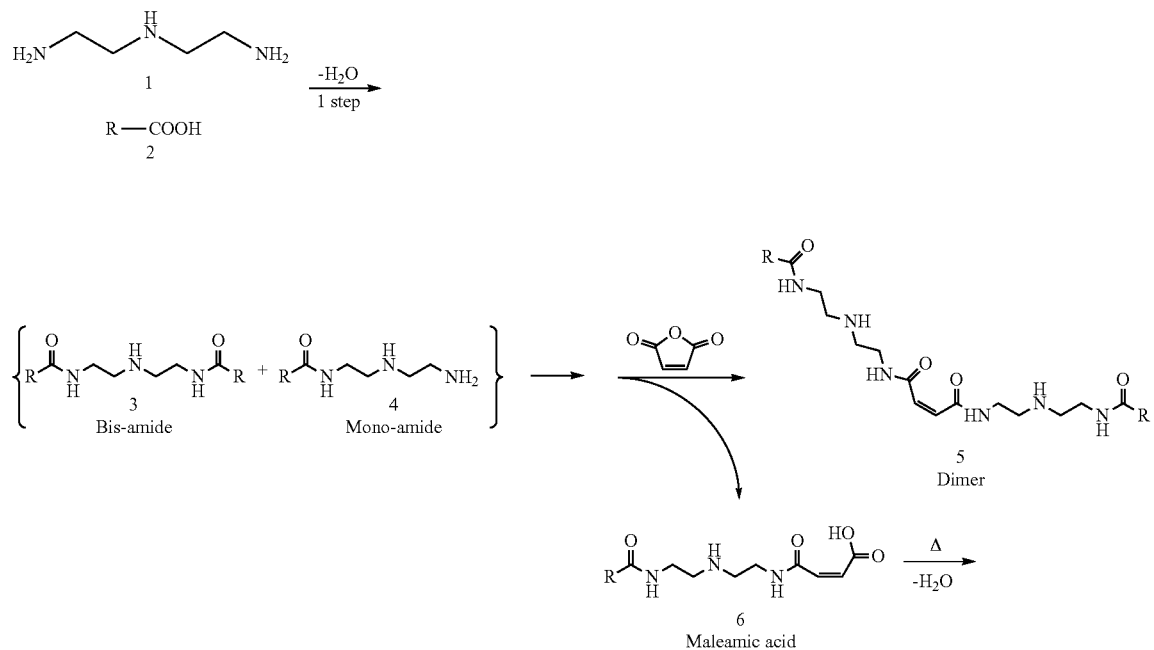

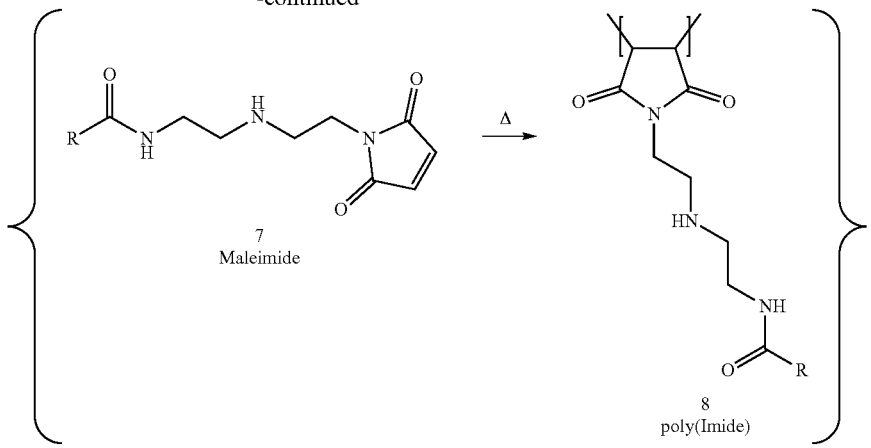

Step 3 was conducted at the preferred heat aging duration, i.e., 4 h at 160° C. The suggested mechanism of reaction of mono-amide (4) intermediate and maleic anhydride is also shown in Scheme 3. The reaction between primary amine, i.e., mono-amide (4) and maleic anhydride takes place under solvent-free conditions (in melt), and requires the reaction to be maintained at 40-80° C. The amide product (6) can also be contaminated with dimer (5). At the reaction temperature of 160° C., maleamic acid (6) is very unstable and forms a mixture of maleimide (7) and poly(maleimide) (8). The reaction goes to completion in less than 2 h at 160° C. to form poly(maleimide) (8). Gel-permeation chromatography data also confirmed the formation of a high molecular weight product.

Table 8 in Example 7 below showed that fluid loss AHR is comparable between the emulsifiers; however, 10-min gels for the low TOFA examples were much higher. This means that substantial deviation from the stoichiometric DETA:TOFA:MA=1:2:1 ratio is not desirable because lower gels are preferred and flatter rheological property (same 10-min gels at 40° F. and 150° F.) are preferred. Preferred properties were observed for the product prepared under preferred conditions (4 hrs, 160° C.) with 1:2:1 molar ratio of DETA:TOFA:MA. Furthermore, emulsifier viscosity for the preferred emulsifier was substantially lower, which is preferable for efficient wellsite delivery. Example 7 also demonstrated that the degree of control needed to be exerted on the commercial process is viable and forgiving.

A difficulty encountered in forming the bis-amide is that the byproduct of TOFA-DETA condensation is water. In the prior art, it was thought that water needs to be removed to allow for formation of the bis-amide via equilibrium. However, water removal can initiate the formation of imidazoline. While it is theoretically possible to revert imidazoline back to bis-amide by dropping the reaction vessel temperature and allowing imidazoline hydrolysis to proceed, however, this takes time. On the other hand, since we have found that some imidazoline formation can be tolerated in subsequent steps, it is more desirable to speed up the reaction rate by controlling temperature and inhibit water removal to minimize imidazoline formation. This is conveniently achieved by using a closed reactor for amidification.

Examples 1 and 2 below describe the synthesis of bis-amide prepared from the reaction between DETA and oleoyl chloride (step 1, method A) and from DETA and TOFA in open (step 1, method B) and closed (step 1, method C) reactor. The first route, i.e., oleoyl chloride method is suitable for small scale synthesis but is not economically attractive as a manufacturing route. The (step 1) methods B and C are designed more for industrial synthesis, however, facile cyclization of the mono and bis-amide yielded product contaminated with imidazoline as shown in FIG. 1 and Table 8. The step 1 method D is reaction between methyl oleate and DETA. In this method, substituting methyl oleate for oleic acid yielded good conversion to the bis-amide and free of imidazoline but took 4 days. The most suitable method for the preparation of bis-amide in an industrial scale is reaction DETA-TOFA in a closed reactor (method C).

$^1$H NMR and FTIR spectroscopy are desirably used as quality control to evaluate bis-amide to imidazoline ratio. Scheme 4 shows the characteristic 1H NMR chemical shifts in chloroform-d1 used to differentiate bis-amide and imidazoline produced during the Step 1 reaction:

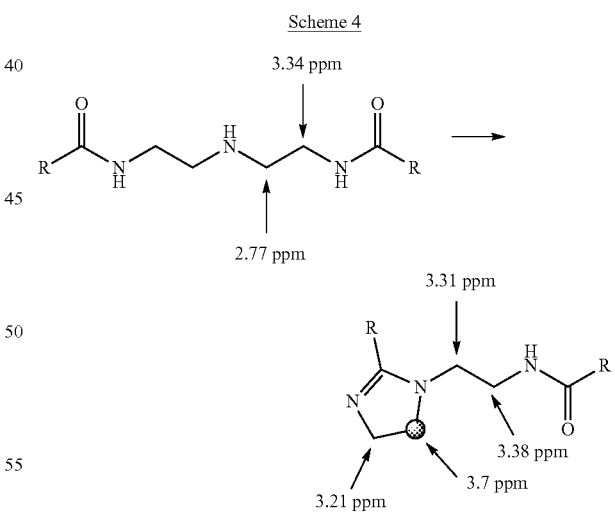

Figure 6:
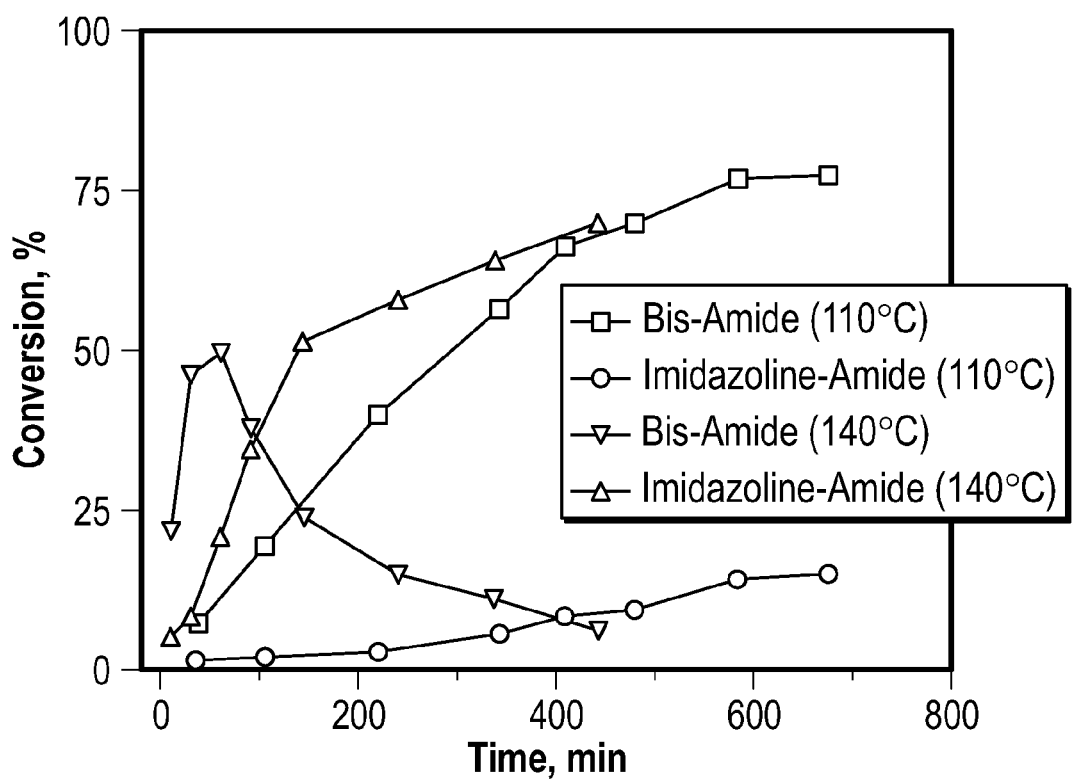
FIG. 6 shows the concentration of products of reaction of tall oil fatty acid (TOFA) and diethylene tetramine (DETA) by $^1H$ NMR, which proceeded with a constant nitrogen flow in an open reactor at 110° C. and 140° C. in the examples below.

FIGS. 1 and 6 show the composition of the Step 1 reaction studied by $^1$H NMR spectroscopy. The analysis of the ratio of terminal methyl (—CH$_3$) to the other characteristic protons of emulsifier, i.e., δ 3.7 ppm for C(2)H$_2$ in imidazoline was used to measure the relative concentration of imidazoline in the mixture. However, the NMR tool is expensive and not always readily available.

FIG. 2 demonstrates that FTIR is also adequate to differentiate between bis-amide and imidazoline based on FTIR signals that are characteristic of each species. FTIR spectra show characteristic absorption bands of imidazoline and amide structures: 3314 cm$^{-1}$ (Amide I, N—H str.), 1674 cm$^{-1}$ and 1631 cm$^{-1}$ (C═O, Amide I), 1545 cm$^{-1}$ (N—H stretch, Amide II) and 1605 cm$^{-1}$ (>C═N—: C—N stretch in imidazoline). The intensity of the amide/imidazoline absorptions at 1631 cm$^{-1}$ and 1605 cm$^{-1}$ were easily measured and can be used to track imidazoline content.

Figure 3:
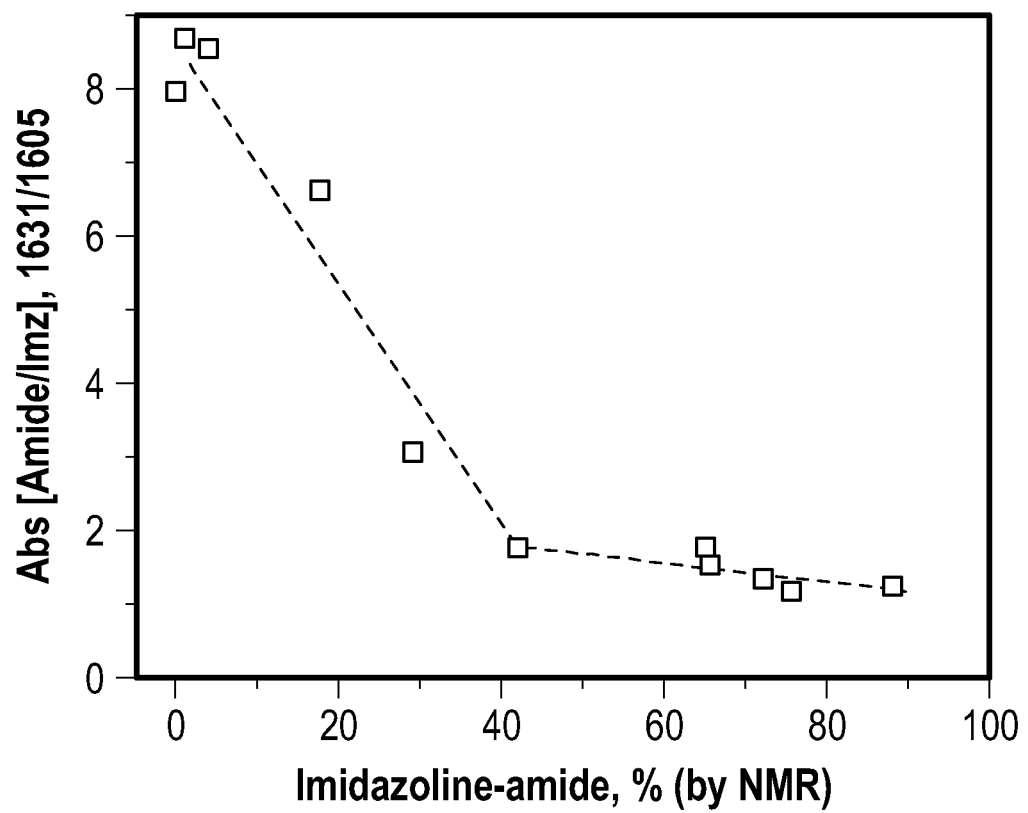
FIG. 3 shows a comparison of the imidazoline-amide concentration formed during step 1 of the emulsifier syntheses in the examples below using $^1H$ NMR and FTIR spectroscopy methods.

FIG. 3 is a comparison of ATR FTIR and NMR spectroscopy methods. FTIR spectroscopy is less sensitive than NMR to differentiate bis-amide to imidazoline ratio at high imidazoline content (>65%). However, FTIR is very sensitive for the analysis of imidazolines in the region of less than 40% with which the present disclosure is concerned. Therefore, to control quality of the intermediate, amine number test can be used to ensure sufficient reaction and FTIR to confirm that over-heating is not done.

Figure 4:
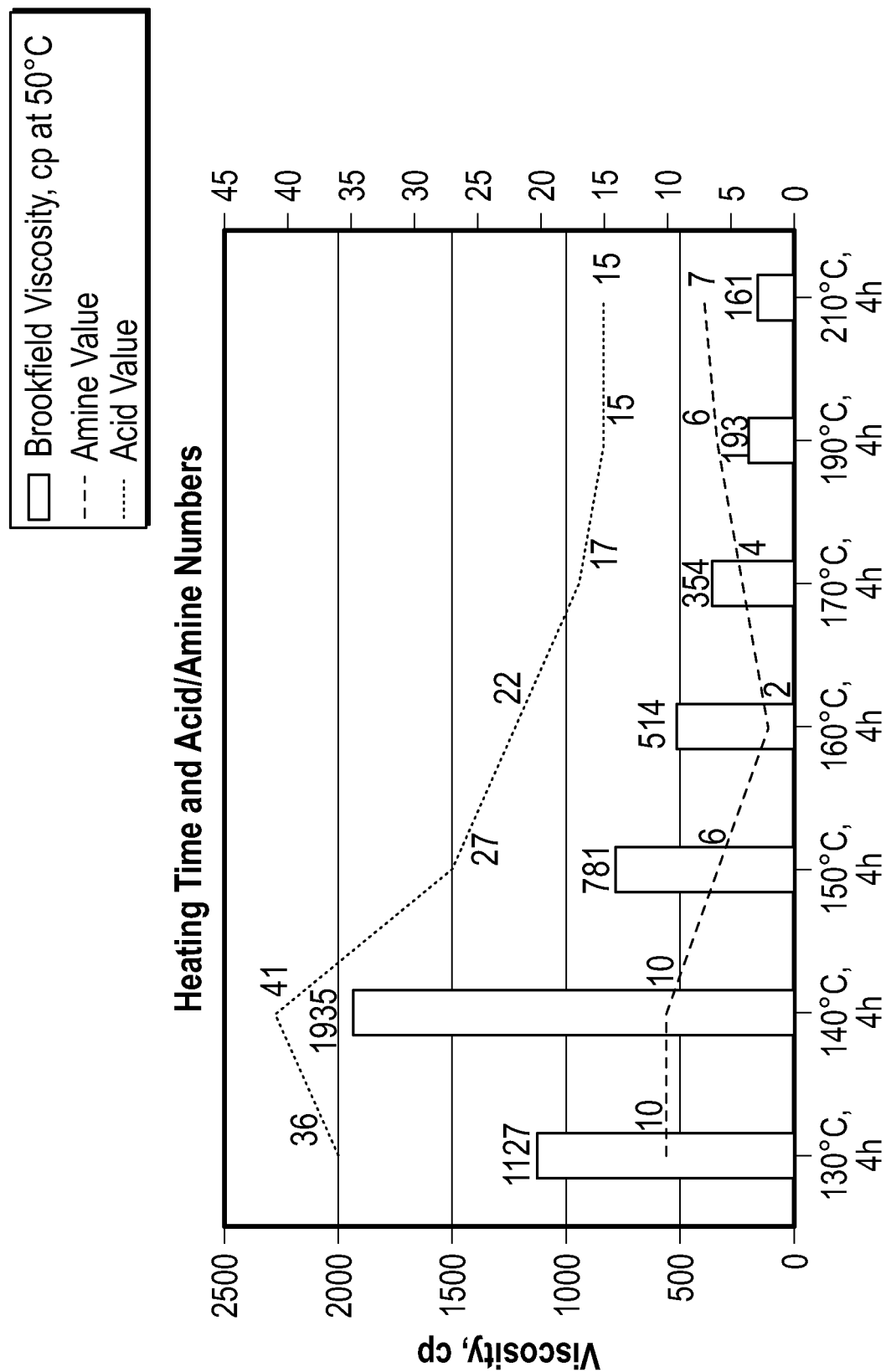
FIG. 4 shows 50° C. viscosity, acid number, and amine number for products with reaction synthesis time of 4 hours at various temperatures in the examples below.

Reaction time and temperature parameters can be important for production of quality product. Here, we propose a series of QC metrics that are preferred for controlling the quality of the emulsifier. Based on Examples 3 and 4, 150-170° C. is the preferred reaction temperature with preferred reaction time of 4 h. FIG. 4 shows the evolution of viscosity (Brookfield at 50° C.), acid value (mg KOH/gram), and amine value (mg KOH/gram) versus reaction temperature. Product, prior to measurement, is mixed with base oil at 50 wt % for ease of handling. From this chart, it is preferred that acid value of 17-27 mg KOH/gram, amine value less than 10, and viscosity of 354-781 centipoise are used to describe emulsifier with good performance characteristics. The time vs temperature chart in FIG. 5 indicates that that 2 hours heating time is enough with 2-4 hours at 160° C. being preferred.

Figure 5:
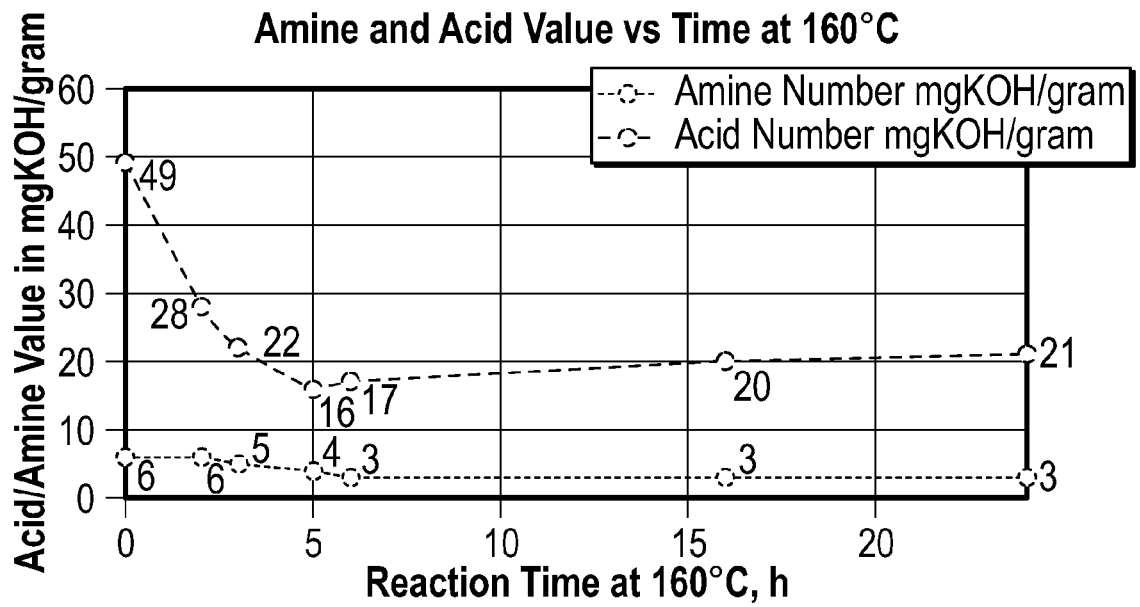
FIG. 5 shows acid number and amine number for products with a synthesis temperature of 160° C. as a function of synthesis time in the examples below.

The final emulsifier package may be formulated with, for example, 20-70 wt %, additional components, such as, for example, base oil, butylene triglycol, butylene diglycol, hexyl carbitol, hexyl cellosolve, hexanol, and many other solvents, such as alcohols and ethoxylated variants, and so on, including combinations thereof. Preferably, the emulsifier is formulated with hydrocarbyl ethoxylate having the formula RO—(CH$_2$CH$_2$O)$_n$H wherein R is a C$_{5-22}$ hydrocarbyl group (branched or linear, saturated or unsaturated, preferably C$_{16-22}$) and n is an integer in the range of 2 to 30, e.g., at 20-70 wt % hydrocarbyl ethoxylate, based on the total weight of the emulsifier formulation. However, amine and acid values are still relevant in the formulated emulsifier metrics because contribution from the emulsifier to these values can be easily calculated based on the data shown in FIGS. 4-5. Also, apparent from the chart in FIG. 5 is that acid/amine values are excellent to evaluate incomplete reaction, but they may not be sufficient to evaluate an overheated reaction. Overheating is also determinantal to performance, therefore using 3 metrics shown in the FIG. 4 example are important to ensure consistent and high-performance amidoamine is prepared.

The formulated emulsifier composition of the present disclosure may be employed in an OBM in amounts from 1.5 to 20 lb/bbl, preferably from 6 to 12 lb/bbl. The OBM is generally prepared by mixing the components together in any order. If desired, the emulsifier composition can be added in a concentrated masterbatch up to 50 wt % in base oil.

Wellbore fluids in accordance with the present disclosure include aqueous and oil-based wellbore fluids. In one or more embodiments, wellbore fluids include direct and invert emulsions. In some embodiments, wellbore fluids may include a high internal phase ratio (HIPR) emulsion in which the volume fraction of the internal aqueous phase is a high as 90 to 95 percent. Suitable oil-based or oleaginous fluids may be a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In one or more embodiments, the wellbore fluid may be an invert emulsion having a continuous oleaginous phase and a discontinuous aqueous (or non-oleaginous liquid) phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

Wellbore fluids in accordance with the present disclosure may further contain additives in addition to the emulsifier composition of this disclosure. When formulated as an invert emulsion, wellbore fluids may contain additional chemicals depending upon the end use of the fluid so long as they do not interfere with the functionality of the fluids (particularly the emulsion when using invert emulsion fluids) described herein. For example, weighting agents, wetting agents, organophilic clays, viscosifiers, fluid loss control agents, surfactants, dispersants, interfacial tension reducers, pH buffers, corrosion inhibitors, mutual solvents, thinners, thinning agents and cleaning agents may be added to the fluid compositions of this invention for additional functional properties.

The method used in preparing wellbore fluids described herein is not critical. Conventional methods can be used to prepare the well bore fluids in a manner analogous to those normally used to prepare conventional wellbore fluids. In one representative procedure, a desired quantity of oleaginous fluid such as a base oil and a suitable amount of non-oleaginous fluid may be combined, and the remaining components and additives may be added together or sequentially with continuous mixing. Wellbore fluids of the present disclosure may be formed by vigorously agitating, mixing or shearing the oleaginous fluid and the non-oleaginous fluid.

In particular, the wellbore fluids of the present disclosure may be injected into a work string, flow to bottom of the well bore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Upon introducing a wellbore fluid of the present disclosure into a borehole, a filtercake may be formed which provides an effective sealing layer on the walls of the borehole preventing undesired invasion of fluid into the formation through which the borehole is drilled. Filter cakes formed from wellbore fluids disclosed herein include multiple latex polymers and may have unexpected properties. Such properties may include increased pressure blockage, reliability of blockage, and increased range of formation pore size that can be blocked. These filtercakes may provide filtration control across temperature ranges up to greater than 400° F.

Where the formation is a low permeability formation such as shales or clays, the filtercakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filter cakes formed by wellbore fluids of the present disclosure may effectively seal earthen formations and may be stable at elevated temperatures.

Wellbore fluids in accordance with the present disclosure may be formulated to maintain acceptable low shear rate viscosity (LSRV) over time, particularly at downhole temperatures. Shear rate viscosity and wellbore fluid rheology may be determined in accordance with API Recommended Practice 13D. Operating procedures for several concentric-cylinder viscometers are detailed in API Recommended. Practice 13B-1/ISO 10414-1 or API Recommended Practice 13B-2/ISO-10414-2. In one or more embodiments, the LSRV of wellbore fluids in accordance with the present disclosure measured by FANN 35 rheometer at 3 rpm and 150° F. is in a range having a lower limit selected from any of 7, 8, and 9, to an upper limit selected from any of to 11, 12, and 13, where any lower limit may be combined with any upper limit.

In one or more embodiments, the emulsifiers disclosed herein may produce invert emulsions having increased stability to temperature and pressure aging, particularly when assayed using electrical stability (ES), for example. The ES test, specified by the American Petroleum Institute at API Recommended. Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 The test is performed by inserting the ES probe into a cup of 120° F. (48.9° C.) mud applying an increasing voltage (from 0 to 2000 volts) across an electrode gap in the probe. The higher the ES voltage measured for the fluid, the stronger or harder to break would be the emulsion created with the fluid, and the more stable the emulsion is. Thus, the present disclosure relates to invert emulsion fluids having an electrical stability of at least 50 V in an embodiment, and in the range of 50 V to 1000 V in some embodiments, and from 75 V to 900 V in other embodiments.

Accordingly, the present disclosure provides the following embodiments:

1. An emulsifier composition, comprising iso-amidoamine compound II according to the formula:

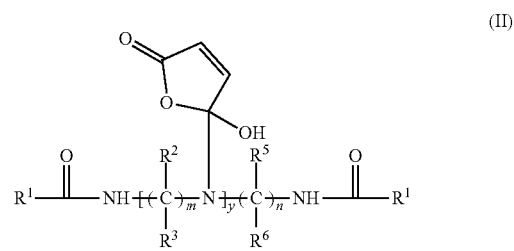

wherein each $R^1$ is a $C_4$ to $C_{30}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5.

2. The emulsifier composition of embodiment 1, comprising a mixture of the iso-amidoamine compound (II) with acid-substituted amidoamine compound (I) and/or formyl-substituted amidoamine compound (III), according to the formula:

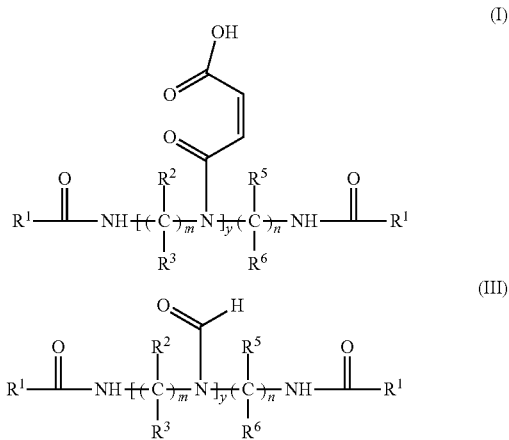

wherein each $R^1$ is a $C_4$ to $C_{30}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5.

3. The emulsifier composition of embodiment 2, wherein molar proportions of compounds (I), (II), and (III), are 0-90:10-100:0-60, preferably 0-90:10-40:0-60, and more preferably 10-90:20-40:10-60, based on the total moles of compounds (I), (II), and (III), present in the emulsifier composition.

4. A process for making the emulsifier composition of any of embodiments 1 to 3, comprising the steps of:
(1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof (preferably the monocarboxylic acid), to form a first reaction product comprising a polyalkyleneamidoamine derivative of the polyalkyleneamine;
(2) reacting the first reaction product from step (1) with a dicarboxylic acid selected from maleic acid, fumaric acid, maleic anhydride, and combinations thereof to form a second reaction product an acid-substituted amidoamine; and
(3) heat treating the maleated amidoamine from step (2) at a temperature and for a time sufficient to form a heat treatment product comprising an isomer of the acid-substituted amidoamine, wherein the heat treatment product has an acid number less than an acid number of the second reaction product.
5. The process of embodiment 4, wherein the polyalkyleneamine has the formula

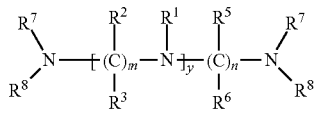

where $R^1$, $R^7$, and $R^8$ are hydrogen; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are an integers from 1 to 10; and y is an integer from 1 to 5; preferably wherein the polyalkyleneamine is selected from the group consisting of diethylenetriamine (DETA), triethylenetetramine (TETA), tetraethylene pentamine (PETA), pentaethylenehexamine (PEHA), and combinations thereof, more preferably the polyalkyleneamine is DETA; and
wherein the monocarboxylic acid is preferably tall oil fatty acid (TOFA), stearic acid, isostearic acid, or a combination thereof, and the dicarboxylic acid is preferably maleic anhydride.
6. The process of embodiment 4 or embodiment 5, wherein the polyalkyleneamidoamine derivative from step (1) has the formula:

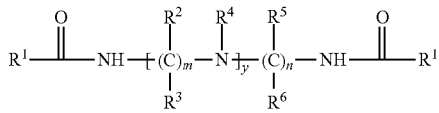

where each $R^1$ is a $C_4$ to $C_{30}$ hydrocarbyl, preferably a $C_{16}$-$C_{18}$ hydrocarbyl, more preferably a branched $C_{18}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; $R^4$ is hydrogen; n and m are independently integers from 1 to 10; and y is an integer from 1 to 5; preferably $R^2$, $R^3$, $R^5$, and $R^6$ are hydrogen, m and n are 2, and y is 1.
7. The process of any of embodiments 4 to 6, wherein step (1) comprises contacting the polyalkyleneamine and the monocarboxylic acid at approximately 110-140° C.

in a closed reactor, to control removal of water formed from amide condensation, and to control imidazoline formation to less than 30%, preferably less than 20%, based on the total moles of the polyalkyleneamine, the polyalkyleneamidoamine derivative, and the imidazoline in the first reaction product, more preferably wherein step (1) further comprises cooling the closed reactor and then opening the cooled reactor to remove water.
8. The process of any of embodiments 4 to 7, wherein a reaction mixture in step (1) comprises a molar ratio of the polyalkyleneamine and the monocarboxylic acid at from 1:1.2 to 1:2.8, preferably from 1:1.6 to 1:2.4, and more preferably from 1:1.8 to 1:2.2.
9. The process of any of embodiments 4 to 8, wherein the acid-substituted amidoamine from step (2) is a compound (I) according to the formula:

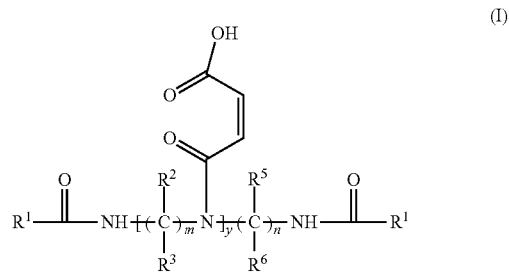

where each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; m and n are integers from 1 to 10; and y is an integer from 1 to 5.
10. The process of any of embodiments 4 to 9, wherein step (2) comprises contacting the first reaction product and the dicarboxylic acid at approximately 70-100° C., for about 0.5-2 h, preferably wherein a molar ratio of the polyalkyleneamidoamine derivative and the dicarboxylic acid is from 1:0.8 to 1:1.2.
11. The process of any of embodiments 4 to 10, wherein the heat treatment in step (3) is conducted at a temperature above 140° C. and/or for a period of time greater than 2 hours, preferably approximately 150-170° C. for 2 to 4 hours.
12. The process of any of embodiments 4 to 11, wherein the heat treatment in step (3) is controlled wherein the heat treatment product has an acid number less than 35 mg KOH/gram, preferably less than 25 mg KOH/gram, an amine number less than 10 mg KOH/gram, and a viscosity of less than 800 centipoise at 50° C. when measured at a dilution of 50 wt % in an IO 1618 base oil
13. The process of any of embodiments 4 to 12, wherein the heat treatment product from step (3) comprises iso-amidoamine compound II or a mixture of iso-amidoamine compound (II) with acid-substituted amidoamine compound (I) and/or formyl-substituted amidoamine compound (III), according to the formulae:

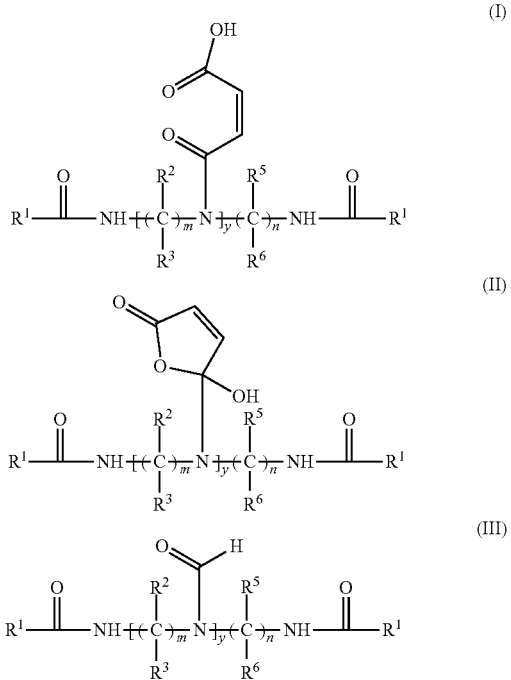

wherein each $R^1$ is a $C_4$ to $C_{30}$ alkyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; n and m are independently integers from 1 to 10; and y is an integer from 1 to 5; and wherein molar proportions of compounds (I), (II), and (III), are optionally 0-90:10-100:0-60, and preferably 0-90:10-40:0-60, based on the total moles of compounds (I), (II), and (III), present in the emulsifier composition.

14. The process of any of embodiments 4 to 13, further comprising formulating an emulsifier composition comprising about 30-80 wt % of the heat treatment product from step (3) and about 70-20 wt % of one or more other components, preferably wherein the one or more other components comprise a hydrocarbyl ethoxylate having the formula RO—$(CH_2CH_2O)_n$H wherein R is a $C_{5-22}$ (preferably $C_{16-22}$) hydrocarbyl group and n is an integer in the range of 2 to 30.

15. The emulsifier composition prepared according to the process of any of embodiments 4 to 14.

16. An invert drilling fluid, comprising:
(a) an oleaginous external phase;
(b) a non-oleaginous internal phase;
(c) the emulsifier composition of any of embodiments 1 to 3 and 15, preferably in an amount of from 1.5 to 20 lb of the emulsifier composition per bbl of invert drilling fluid;
(d) optionally one or more rheology additives; and
(e) optionally one or more wetting additives.

17. The invert drilling fluid of embodiment 16, further comprising a wetting additive comprising a hydrocarbyl ethoxylate having the formula RO—$(CH_2CH_2O)_n$H wherein R is a $C_{5-22}$ (preferably $C_{16-22}$) hydrocarbyl group and n is an integer in the range of 2 to 30.

18. A process for preparing an invert wellbore fluid, comprising the steps of:

(A) making an emulsifier composition according to the process of any of embodiments 4 to 13; and
(B) formulating the emulsifier composition in an emulsifying amount in an invert wellbore fluid comprising an oleaginous external phase, a non-oleaginous internal phase, one or more rheology additives, and one or more wetting additives.

19. The process of embodiment 18, further comprising the step of (C) circulating the invert wellbore fluid from step (B) in a wellbore.

20. The process of embodiment 19, further comprising the step of:
(D) drilling the well while circulating the invert wellbore fluid in step (C).

21. A process for drilling a well, comprising the steps of:
(a) formulating an invert wellbore fluid comprising an oleaginous external phase, a non-oleaginous internal phase, an emulsifier composition according to any of embodiments 1 to 3 and 14, one or more rheology additives, and one or more wetting additives;
(b) circulating the invert wellbore fluid from step (a) in a wellbore; and
(c) drilling the well while circulating the invert wellbore fluid in step (b).

22. The process of embodiment 21, wherein the one or more wetting additives comprise a hydrocarbyl ethoxylate having the formula RO—$(CH_2CH_2O)_n$H wherein R is a $C_{5-22}$ (preferably $C_{16-22}$) hydrocarbyl group and n is an integer in the range of 2 to 30, preferably in an amount of from 0.5 to 8 lb per bbl of invert wellbore fluid.

The disclosure will be illustrated by the following examples which are typical of its scope, but which are not intended in any way to indicate its limits.

EXAMPLES

Example 1 (Comparative)

Synthesis of idealized amidoamine (I) (Scheme 1) and its performance in a typical oil-based drilling fluid formulation. Amidoamine (I) is the structure that is typically drawn in the literature for an effective emulsifier. Amidoamine (I) was precisely synthesized and the idealized emulsifier was compared to a reference amidoamine (I) prepared using a commercial method that produced a range of products, described in Example 2-1 below using synthesis steps 1(C) (closed amidification reactor) and 2 only. This was done as a comparative example to investigate whether the idealized emulsifier would perform better than the commercially synthesized emulsifier.

High quality N,N'-(azanediylbis(ethane-2,1-diyl))dioleamide was synthesised by reaction of oleoyl chloride with diethylenetriamine (DETA) in N,N-dimethylformamide, in the presence of pyridine, to obtain a white powder. The reaction was conducted at ambient temperature such that formation of the imidazoline was precluded. NMR and FTIR spectroscopic analysis were conducted to confirm the structure of N,N'-(azanediylbis(ethane-2,1-diyl))dioleamide. The $^1$H NMR spectrum of N,N'-(azanediylbis(ethane-2,1-diyl)) dioleamide showed two characteristic multiplets for the methylene protons alpha to nitrogen at 3.3 ppm (4H, alpha to amides) and at 2.8 ppm (4H, alpha to amine). The $^{13}$C NMR spectrum showed one carbonyl signal at 173 ppm supporting symmetric amide formation. The FTIR spectrum clearly showed the secondary amide bands at 1633 cm$^{-1}$ (Amide I band, CO=str.), 1543 cm$^{-1}$ (Amide II band, N—H def) and 3304 cm$^{-1}$ (N—H str.) with the C—N bend at 1228 cm$^{-1}$ and the C—N wag at 720 cm$^{-1}$.

Next, the N,N'-(azanediylbis(ethane-2,1-diyl))dioleamide was heated to ~80° C. to give a melt, solid maleic anhydride was added, and the mixture was stirred at 80° C. for 5 mins to give (Z)-4-(bis(2-oleamidoethyl)amino)-4-oxobut-2-enoic acid as an off-white, amorphous solid. Reacting the bis-amide, formed from oleoyl chloride and the amidoamine, with maleic anhydride, resulted in a conversion of ~100% (by 1H NMR) and the product was insoluble in base oil NEODENE® IO 1618 (Shell Oil). NMR and FTIR spectroscopies and mass spectrometry (MS) analysis were conducted to confirm the structure of the desired target. The olefinic protons associated with the 4-oxobut-2-enoic acid functionality at 6.69 ppm and 6.30 ppm exhibited a coupling constant of 13 Hz, which is consistent with formation of the desired cis-(Z) isomer. The DC NMR spectra showed three carbonyl signals, the signal at 174.5 ppm assigned to the amide of the fatty acid/DETA linkage, the signal at 168 ppm assigned to the secondary amide carbonyl, and the signal at 166 ppm assigned to the maleamic acid carbonyl. The olefinic carbon of the 4-oxobut-2-enoic moiety was observed at 133.5 ppm and those of the fatty acid at 129-130 ppm. The FTIR spectrum was consistent with the idealized structure, showing the carbonyl stretch at 1711 cm$^{-1}$ and the two amide stretches at 1643 cm$^{-1}$ and 1621 cm$^{-1}$.

Mass spectrometry was conducted on (Z)-4-(bis(2-oleamidoethyl)amino)-4-oxobut-2-enoic acid to confirm the molecular weight and aid in the identification of trace impurities. When the sample was prepared in methanol/dichloromethane (10:1) the MS, in positive mode, showed a primary peak at m/z 632 supporting N,N'-(azanediylbis (ethane-2,1-diyl))dioleamide (MW 632). However, the $^1$H NMR spectrum did not support a significant amount of this material being present in (Z)-4-(bis(2-oleamidoethyl) amino)-4-oxobut-2-enoic acid. The primary peak at m/z 728 seen in negative mode was consistent with (Z)-4-(bis(2-oleamidoethyl)amino)-4-oxobut-2-enoic acid (9) (MW=730). The amine value for (Z)-4-(bis(2-oleamidoethyl)amino)-4-oxobut-2-enoic acid was calculated to be 7 mg KOH/gram. Although not zero, it supported good conversion of N,N'-(azanediylbis(ethane-2,1-diyl))dioleamide to (Z)-4-(bis(2-oleamidoethyl)amino)-4-oxobut-2-enoic acid.

Next, the performance of the idealized (Z)-4-(bis(2-oleamidoethyl)amino)-4-oxobut-2-enoic acid was investigated in a typical oil-based drilling fluid formulation. The drilling fluid formulation used to evaluate the emulsifiers of this disclosure is shown in Table 1.

TABLE 1

Typical mud formulation used to compare emulsifiers, 14.3 lb/gal, 75/25 oil/water ratio.

| Treatment | Mass, g |
|---|---|
| Base oil | 136 |
| Emulsifier (50 wt % in base oil) | 8.54 |
| Wetting agent 1 (RO—(CH$_2$CH$_2$O)$_n$H, R = oleyl, n = 3) | 3.00 |
| Wetting agent 2 | 0.15 |
| Organoclay | 0.50 |
| LIME | 3.00 |
| 25% CaCl$_2$ Brine | 84.6 |
| Suspending clay solids | 9.0 |
| Fluid loss additive | 0.50 |
| Rheology modifier | 2.23 |
| Barite | 353 |

This non-aqueous drilling fluid (NAF) was tested at 325° F. and properties evaluated after 16 hours hot roll (AHR) and then after 7-day static test (ASA), after hot roll rheology and fluid loss properties were evaluated. After 7-days the mud was re-constituted and the same properties as the AHR fluid were tested. The AHR and ASA properties were compared in Tables 2 (a) and 2 (b), which showed that the performance of the ultra-pure, idealized emulsifier (Table 2 (b)) was inferior to the reference material prepared by synthesis scheme 1, steps 1 and 2 (Table 2 (a)). For example, comparing the viscosity at 6 rpm at 150° F. for AHR and ASA data, it was observed that the idealized emulsifier showed a much larger change in the low shear rate viscosity (LSRV) which is undesirable. This result indicated that the structure that is shown in the literature is not solely responsible for the emulsification properties of the commercially prepared material.

TABLE 2(a)

Mud performance using commercially prepared emulsifier.

| Parameter | AHR Fluid | | ASA Fluid | |
|---|---|---|---|---|
| Heat Aging Temp, ° F. | 325 | | 325 | |
| Heat Aging, h | 16 | | 16 + 7 days | |
| Static/Dynamic | D | | S | |
| Mud Weight, 1 b/gal | 14.3 | | 14.3 | |
| Rheology Temp, ° F. | 40 | 150 | 40 | 150 |
| 600 rpm, ° VG | 198 | 67 | 202 | 84 |
| 300 rpm, ° VG | 110 | 44 | 114 | 59 |
| 200 rpm, ° VG | 75 | 35 | 79 | 47 |
| 100 rpm, ° VG | 43 | 25 | 46 | 35 |
| 6 rpm, ° VG | 12.0 | 12.0 | 12.0 | 16.0 |
| 3 rpm, ° VG | 11.5 | 10.4 | 11.0 | 15.0 |
| PV, cp | 88 | 23 | 88 | 25 |
| YP, lb/100 ft$^2$ | 22 | 21 | 26 | 34 |
| LSYP, lb/100 ft$^2$ | 11 | 9 | 10 | 14 |
| 10-sec Gel, lb/100 ft$^2$ | 14.7 | 11.5 | 18 | 16 |
| 10-min Gel, lb/100 ft$^2$ | 41 | 13.7 | 43 | * |
| HTHP Temp, ° F. | 325 | | 325 | |
| HTHP FL, ml | 7.5 | | 41 | |
| Water in HTHP filtrate, ml | 0 | | 7.2 | |

* Too high to measure.

TABLE 2(b)

Mud performance using idealized emulsifier.

| Parameter | AHR Fluid | | ASA Fluid | |
|---|---|---|---|---|
| Heat Aging Temp, ° F. | 325 | | 325 | |
| Heat Aging, h | 16 | | 16 + 7 days | |
| Static/Dynamic | D | | S | |
| Mud Weight, 1 b/gal | 14.3 | | 14.3 | |
| Rheology Temp, ° F. | 40 | 150 | 40 | 150 |
| 600 rpm, ° VG | 197 | 73 | 195 | 85 |
| 300 rpm, ° VG | 110 | 46 | 114 | 58 |
| 200 rpm, ° VG | 79 | 36 | 84 | 48 |
| 100 rpm, ° VG | 45 | 26 | 51 | 39 |
| 6 rpm, ° VG | 7.9 | 14.6 | 19.0 | 33.0 |
| 3 rpm, ° VG | 6.9 | 14.5 | 18.0 | 34.0 |
| PV, cp | 87 | 27 | 81 | 27 |
| YP, lb/100 ft$^2$ | 23 | 19 | 33 | 31 |
| LSYP, lb/100 ft$^2$ | 6 | 14 | 17 | 35 |
| 10-sec Gel, lb/100 ft$^2$ | 8.6 | 16 | 23 | 35 |
| 10-min Gel, lb/100 ft$^2$ | 33.9 | 33 | 79 | 31 |
| HTHP Temp, ° F. | 325 | | 325 | |
| HTHP FL, ml | 2.8 | | 36 | |
| Water in HTHP filtrate, ml | trace | | 5 | |

Example 2-1 (Comparative and Embodiments)

Synthesis of bis-amide and acid-substituted amidoamine (I) according to embodiments of the present disclosure. In this example, we investigated different synthesis conditions for the step 1 amidification:

Step 1 (method A): Bis-amide was synthesised by reaction of oleoyl chloride with DETA in N,N-dimethylformamide, in the presence of pyridine at room temperature as described in Example 1.

Step 1 (method B): A commercially available tall oil fatty acid (TOFA, 281 g) was added to 51.58 g of diethylenetriamine under constant nitrogen flow in 1 L glass reactor open to air and then heated to 110° C. (or 140° C.) for 12 hrs using a magnetic stirrer on a hot plate. After the completion of the reaction, the reaction mixture was cooled to room temperature. $^1$H NMR spectroscopy was used to study the product composition as described in Example 1. The results shown in FIG. 6 indicate that the product of step 1, method B was heavily contaminated with imidazoline-amide (see scheme 2).

Step 1 (method C): TOFA (281 g) was added to 51.58 g of diethylenetriamine under nitrogen flow in 1 L glass reactor and the reaction temperature was maintained at 80-90° C. for 30 min and stirred continuously with a magnetic stirrer. The reactor was then closed and heated to 130° C. for 20 hrs. When the reaction was complete, the reactor was opened to air and water vapor was removed in a stream of nitrogen for 30-60 min. This reaction mixture was cooled to room temperature. $^1$H NMR spectroscopy was used to confirm the formation of bis-amide. The yield of imidazoline was 17%.

Step 1 (method C-1): Method C was repeated except that the reactor was cooled prior to the removal of water vapor. Using the described method, we were able to obtain the bis-amide with a minimum content of 3% imidazoline by reducing the temperature of the reactor prior to the removal of water vapor.

Step 1 (method D): DETA (30 g) was blended with 172.43 g of methyl oleate at ambient temperature. The solution was stirred at 110° C. for 4 days with glass condenser. Aliquots were removed periodically and analyzed by $^1$H NMR and FTIR. After 4 days the residual methanol was removed at 110° C. in vacuum. Analysis of the reaction product by $^1$H NMR showed that it contained a mixture of bis-amide, 94%, and unreacted methyl oleate, 6%. No residual DETA or imidazoline were detected in the NMR spectra.

Example 2-2 (Comparative and Embodiments)

Next, we prepared a baseline material for reference by reacting the bis-amide from step 1, method C, with maleic anhydride.

Step 2: Under an atmosphere of nitrogen, 100 g of bis-amide produced via Step 1, method C, contaminated with 17% of imidazoline, were heated to 60-70° C. and 15.49 g of maleic anhydride were added stepwise at such rate to keep the temperature below 90° C. The reaction was accompanied by an increase in temperature, and a liquid viscous product was formed within 10-30 mins. The formation of amidoamine (I) was confirmed by $^1$H NMR spectroscopy as described in Example 1.

Example 3 (Comparative and Embodiments)

Synthesis of thermally-aged emulsifier in step 3 and the effect of the heat treatment temperature on the performance of thermally-aged emulsifier in a typical oil-based drilling fluid formulation.

Step 3: Under an atmosphere of nitrogen, the reaction product from steps 1 (Method C, 17% imidazoline) and 2 was heated in a closed reactor at temperatures ranging from 130 to 210° C. for 4 hrs. When the reaction was complete, heating was stopped, the reactor was opened to the atmosphere and the emulsifier was diluted to 50 wt % with base oil (TO 1618).

Next, the performance of the emulsifiers was studied in a typical oil-based drilling fluid formulation (Table 1). FIG. 6 shows fluid loss comparison for a series of emulsifiers that was prepared with the same synthesis time but different synthesis temperatures.

TABLE 3

HPHT values for different synthesis temperatures (vary step 3 temperature at constant duration of 4 hours)

| Material/Steps (1/2/3) | Step 3 Temp., ° C. | HTHP AHR 325° F. Fluid Loss, ml |
|---|---|---|
| Baseline - Step 1(C)/2 only (I) | N/A | 7.5 |
| Step 1(C)/2/3 | 130 | 5 |
| Step 1(C)/2/3 | 140 | 3.6 |
| Step 1(C)/2/3 | 150 | 3.4 |
| Step 1(C)/2/3 | 160 | 2.8 |
| Step 1(C)/2/3 | 170 | 3 |
| Step 1(C)/2/3 | 180 | 4.6 |
| Step 1(C)/2/3 | 190 | 5 |
| Step 1(C)/2/3 | 200 | 4.6 |
| Step 1(C)/2/3 | 210 | 5.2 |

Example 4 (Comparative and Embodiments)

Synthesis of thermally aged emulsifier in step 3 and the effect of the heat treatment time at 160° C. on the performance of thermally aged emulsifier in a typical oil-based drilling fluid formulation. A series of emulsifiers was prepared according to the method described in Example 3 (steps 1(C)/2/3), but the conditions for Step 3 were 160° C. for 2, 4, 6, 16 and 24 h. The performance of emulsifiers was studied in a typical oil-based drilling fluid formulation (Table 1). HPHT results for different reaction times at the preferred temperature of 160° C. are shown in Table 4.

TABLE 4

HTHP values for different heat aging times at 160° C.

| Material/Steps (1/2/3) | Step 3 duration, h | HTHP AHR 325° F. Fluid Loss, ml | HTHP ASA 7 d Fluid Loss, ml |
|---|---|---|---|
| Baseline - Step 1(C)/2 only (I) | 0 | 7.5 | 41 (+water in filtrate) |
| Step 1(C)/2/3 | 2 | 2 | 24 |
| Step 1(C)/2/3 | 4 | 2.8 | 10.8 |
| Step 1(C)/2/3 | 6 | 4 | 21 |
| Step 1(C)/2/3 | 16 | 4 | 23 |
| Step 1(C)/2/3 | 24 | 6 | 16.4 |

Fluid loss result AHR and ASA were lowest for the sample heated for 4 hrs. It is likely that temperature and time are factors that both influence performance and lower reaction temperatures coupled with higher reaction time can achieve similar result as higher reaction temperature and lower reaction time. Reaction temperatures that are too low can be less economical because reaction times are generally too long. Reaction temperatures that are too high can be difficult to control in a large production scale and may favor the excessive formation of formyl amidoamine (III).

Besides HPHT fluid loss, emulsifier quality has a significant effect on low end rheology LSRV which is 6 RPM at 150° F. and 10-min gel readings on FANN35. Drilling fluids formulated with low-performing emulsifier tend to increase in 6 rpm reading and gel formation.

Table 5 shows that the emulsifier prepared under preferred conditions shows lowest change in 6 rpm dial reading at 150° F. While 6 rpm value is formulation-dependent, here 3 fluids were prepared under same conditions with only one variable change, demonstrating that the effect on this property is only related to emulsifier.

TABLE 5

FANN 35 Dial reading values for different step 3 heat aging temperatures

| Material/Steps (1/2/3) | Heat Aging Duration, h | Heat Aging Temperature, ° C. | FANN35 6 rpm AHR 150° F., ° VG | FANN35 6 rpm ASA 150° F., ° VG |
|---|---|---|---|---|
| Baseline - Step 1(C)/2 only (I) | N/A | N/A | 12 | 16 |
| Step 1(C)/2/3 | 4 | 130 | 15 | 49 |
| Step 1(C)/2/3 | 4 | 160 | 8 | 20 |
| Step 1(C)/2/3 | 4 | 210 | 17 | 40 |

Table 6 shows the evolution of gel values after hot roll and static aging. Emulsifier prepared under preferred conditions, i.e., 160° C., 4 h, shows gel values to be lowest and gel changes least when comparing AHR and ASA values.

TABLE 6

10 Minute gel values for different heat aging temperatures

| Material/Steps (1/2/3) | Heat Aging Duration, h | Heat Aging Temperature, ° C. | AHR 10 minute gel at 150° F., lb/100 ft² | ASA 10 minute gel at 150° F., lb/100 ft² |
|---|---|---|---|---|
| Baseline - Step 1(C)/2 only (I) | N/A | N/A | 14 | ND |
| Step 1(C)/2/3 | 4 | 130 | 38 | 92 |
| Step 1(C)/2/3 | 4 | 160 | 27 | 44 |
| Step 1(C)/2/3 | 4 | 210 | 43 | 67 |

ND - not determined.

Additional benefits of the thermal treatment of product (I) are the improved physical properties of product (II). Product (I) in its pure state is a white solid that is difficult to formulate into a usable system for wellsite delivery and difficult to incorporate into a drilling fluid. Correct heat-treatment regime improves the solubility of emulsifier for ease of formulation efforts in addition to improving the properties of the drilling mud.

Example 5 (Comparative)

Synthesis of (Z)-4-(dibutylamino)-4-oxobut-2-enoic acid (10a) and (Z)-4-(didecylamino)-4-oxobut-2-enoic acid (10b). Thermal decomposition mechanisms of maleimic acid derivatives that occur during amidoamine aging. The reaction of maleic anhydride with secondary amine is particularly important since the combination of maleic acid functionality (but-2-eneoic acid) coupled with secondary amine, i.e., bis-amide gives the emulsifier its anionic character which we believe is important and is the main driver of thermal instability. We modelled this reaction by studying the reaction between dibutyl amine (9a) (and didecylamine (9b)) and maleic anhydride. Compound (10) was prepared by reaction of maleic anhydride with secondary amine according to Scheme 5:

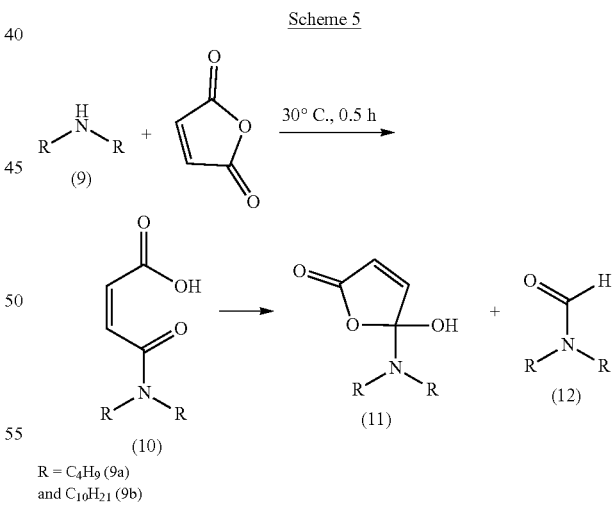

Scheme 5

Maleic anhydride powder (1 eq.) was added stepwise to dibutylamine or didecylamine (1 eq.) at ambient temperature. The reaction was moderately exothermic and took ~20-30 min for completion at ambient temperature. The product (10) was a syrupy mass and was soluble in chloroform, benzene and methanol. Compound (10a) (R=$C_4H_9$): ATR FTIR: (liquid, cm$^{-1}$) 2958, 2932, 2873, 1713, 1620, 1552, 1456, 1434, 1371, 1219. $^1$H NMR (400 MHz, $C_6D_6$)

δ −15.5 (s, broad), 5.48 (d, J=12.8 Hz, 1H), 5.29 (d, J=12.9 Hz, 1H), 2.35-2.27 (m, 2H), 2.04-1.94 (m, 2H), 0.61-0.50 (m, 2H), 0.41-0.28 (m, 4H), 0.25-0.13 (m, 2H), 0.08 (d, J=7.3 Hz, 6H). $^{13}$C NMR (101 MHz, C$_6$D$_6$) δ 166.15, 165.21, 134.63, 128.60, 48.73, 46.74, 31.07, 29.26, 20.08, 19.67, 13.61, 13.50.

The product was identified on the basis of IR and $^1$H, $^{13}$C, HSQC-TOCSY, and HMBC NMR studies. The presence of two doublets at δ 6.24 and 6.00 ppm with a $J_{HH}$ of ~13 Hz indicated the formation of the maleimic acid derivative (10). The structure (10) was recognized unambiguously by the $^1$H—$^{13}$C correlated 2D NMR spectrum, wherein two proton signals at δ 6.24 and 6.00 ppm correlated with the $^{13}$C NMR signals at δ 134.61 and δ 128.64 ppm, respectively, thereby confirming the vinylic nature of the protons. It is recognized that the chemical shift of vinylic protons and protons at C$_{10}$ and C$_9$ are sensitive to solvent nature. The best peak to peak resolution is observed for benzene. However, in benzene, over time, two vinyl protons are merged into broad singlet δ 6.24 ppm. HSQC-TOCSY 2D NMR showed two very strong cross-peaks δ 6.24-134.61 and 6.24-128.64, that suggested the vinylic nature of broad peak δ 6.24 ppm. The composition of (10b) (R=C$_{10}$H$_{21}$) was supported by LC/MS data by presence of molecular ion peak m/z 396.3 (C$_{24}$H$_{45}$NO$_3$).

The reaction of secondary amines with maleic anhydride groups has not been studied extensively. Prior work has been done examining the reaction of secondary amines, namely 1-methylpiperazine, pyrrolidine, morpholine, 2-methylpiperidine, and diethylamine, with maleic anhydride. Under kinetic control, i.e., at −78° C., amines add across the C=O functionality (13) exclusively and the initially formed addition products isomerize to the corresponding N-substituted maleimic acid derivatives (14) as shown below in Scheme 6:

Scheme 6

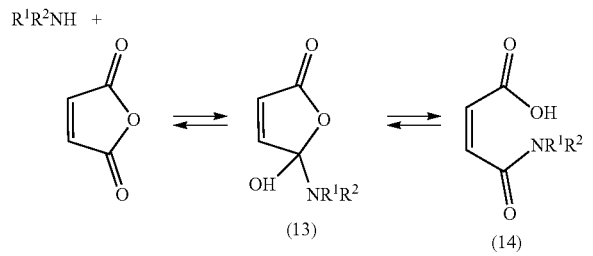

In contrast to this prior work, in the present disclosure, the reaction between dibutylamine (didecylamine) with maleic anhydride in solvent-free conditions resulted in full conversion to N-substituted maleimic acid derivative (10).

Figure 7:
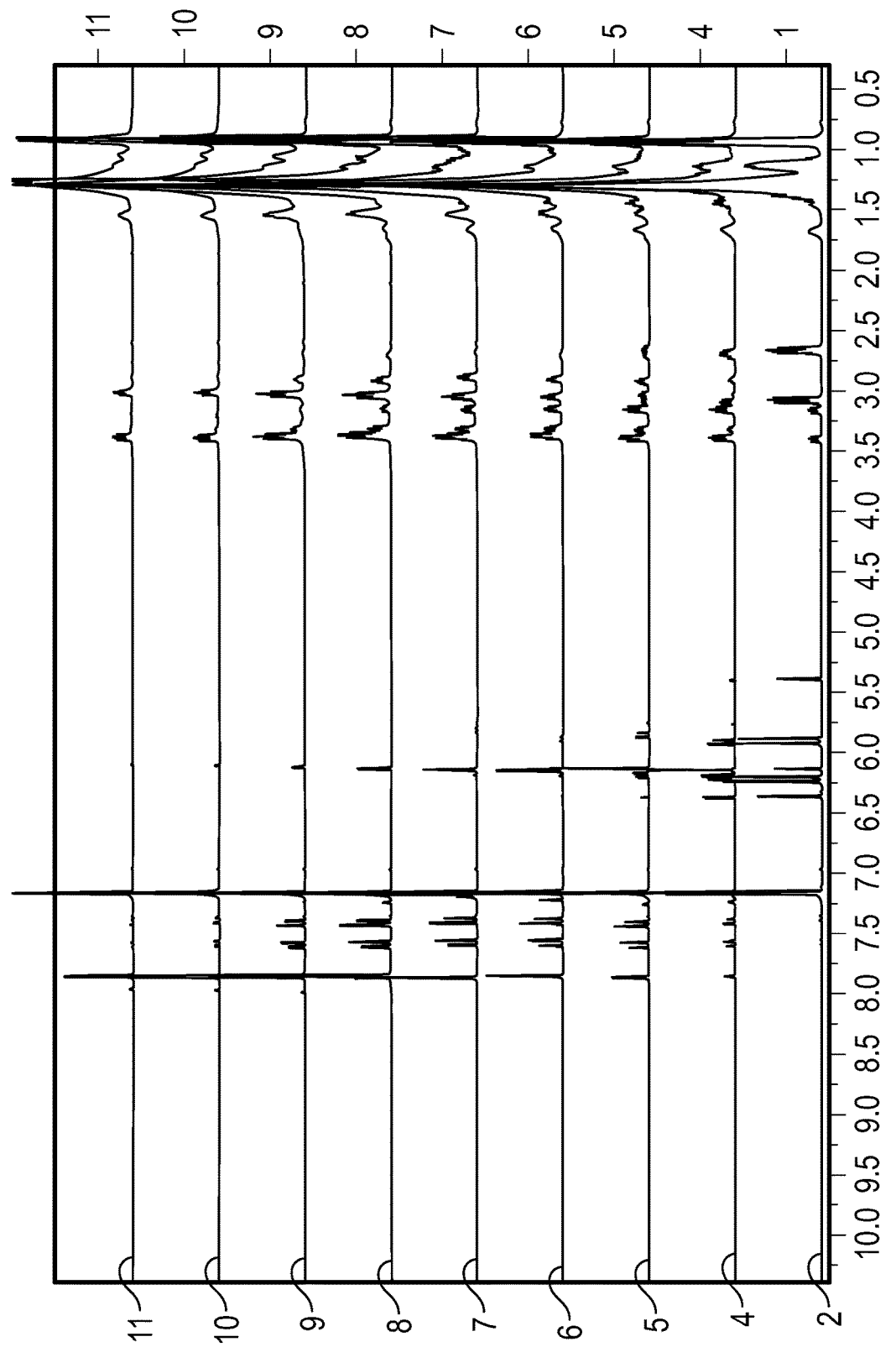
FIG. 7 shows a series of $^1H$ NMR spectra of a maleamic acid compound (I) aged at 160° C. as a function of time (10 min to 74 h) in the examples below, in which chemical shifts are reported relative to benzene-$d_6$.
Figure 8:
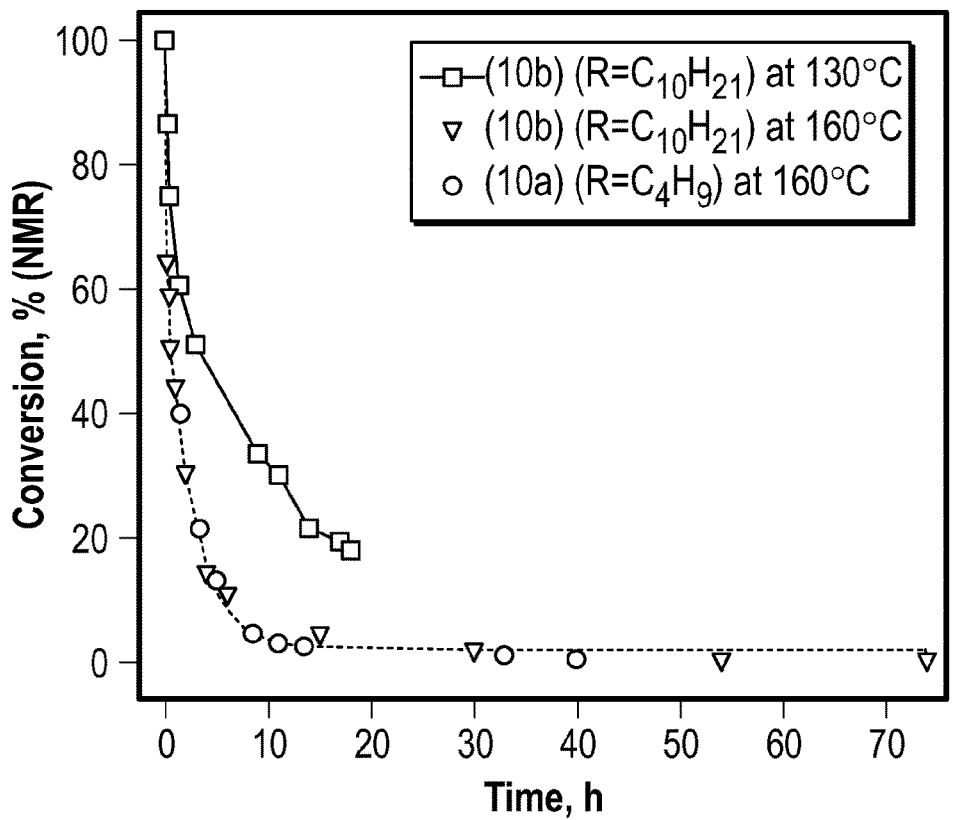
FIG. 8 shows conversion of maleamic acid compounds (10a) and (10b) vs time at 130 and 160° C. in the examples below.

To elucidate the thermal decomposition mechanisms of maleimic acid derivatives, the decomposition of maleimic acid derivative (10) was carried out in the melt (in the absence of solvent) at 130 and 160° C. and the product composition of (10) was determined by 1H-13C correlated 2D NMR and FTIR spectroscopy, and LC/MS analysis. In this experiment, a 20 g sample of maleimic acid derivative (10) was heated to a designated temperature for a certain period and subsamples of aged products were analyzed by various NMR techniques and ATR FTIR spectroscopy. As an example, FIG. 7 shows the $^1$H NMR spectral profiles taken in the course of degradation of maleimic acid (10). The percentages of the corresponding maleimic acid (10) were determined on the basis of the $^1$H NMR spectra. The residual concentration of model emulsifiers (10) decreased with temperature and time (FIG. 8). For example, at 160° C., the concentration of (10) decreased exponentially with time (dotted curve) and practically did not depend on their chemical composition, i.e., the length of the saturated aliphatic chain. A similar decomposition kinetic profile was found for short, R=C$_4$H$_9$ and long chain, R=C$_{10}$H$_{21}$ derivatives (10a and 10b).

Figure 9:
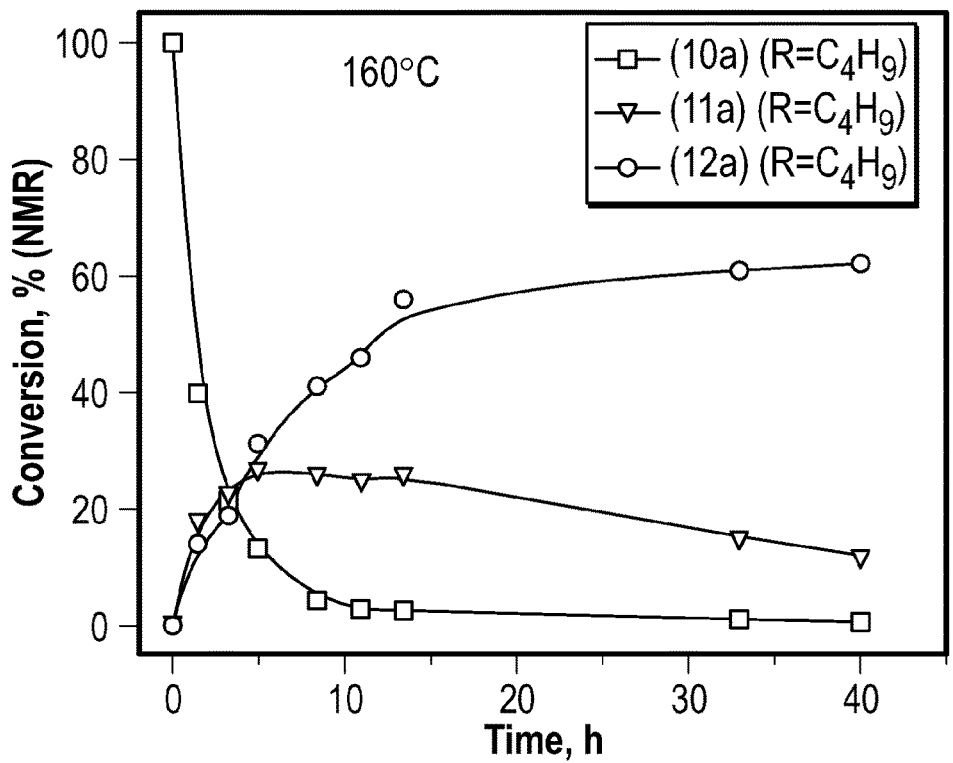
FIG. 9 shows the concentration of maleamic acid compound (10a) and its decomposition products (11a) and (12a) at 160° C. in the examples below.

The kinetic profile and the proposed mechanism of thermal degradation of (10a, R=C$_4$H$_9$) at 130-160° C. are shown in Scheme 5 and FIG. 9. At elevated temperatures, N-substituted maleimic acid (10) was unstable and initially isomerized to the corresponding C=O addition product (11), and then decomposed to N-substituted formamide (12). Polymers were not seen, however GPC analysis revealed that a certain fraction of the decomposed material had an increased molecular weight (M$_w$~1100).

The analysis of FIG. 9 shows that the concentration of the product (11) was maximum, 27% at 5 h at 160° C. and then decreased with time due to formation of (12). Formation of the product (11), resulting from addition of amine across the C=O group of maleic anhydride, was confirmed by the presence of two doublets in the 1H NMR spectrum at δ 7.37 and 7.54 ppm with a $J_{HH}$ of 15 Hz and a broad signal at δ 9-10 ppm, corresponding to —OH group (at C5). The structure of compound (11) was established explicitly by the $^1$H-$^{13}$C correlated 2D NMR HSQC-TOCSY spectrum, wherein two proton signals at δ 7.37 and 7.54 ppm correlated with the $^{13}$C NMR signals at δ 132.06 and δ 134.22 ppm, respectively. HMBC showed that C$_2$ carbon C=O δ 167.5 correlated with proton signals δ 7.37 and 7.54; and C$_5$ carbon δ 164.2 correlated with proton signals δ 7.37, 7.54 and 2.8, 3.2.

Formation of the product (12), resulting from decomposition of (10) and (11), was confirmed by the presence of singlet in the $^1$H, $^{13}$C NMR at δ 7.8 ppm and C1 carbon C=O δ 164.3 ppm. The fraction of N-formyl product (12) increased with aging at 160° C.

Example 6 (Comparative)

Synthesis of formyl-amide emulsifier and its performance in a typical oil-based drilling fluid formulation. Formyl-amide (12) was synthesised in a two-step process shown in Scheme 7:

Scheme 71

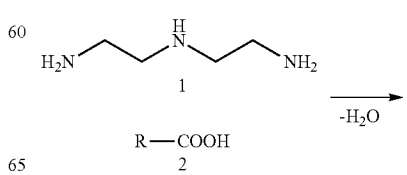

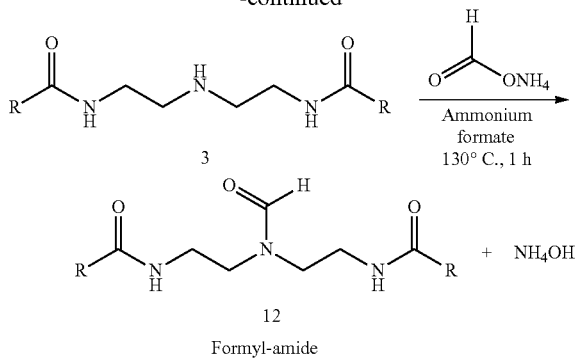

3

12
Formyl-amide

The first step was the condensation reaction of tall oil fatty acid (TOFA) (2) and diethylenetriamine (DETA) (1). DETA (0.3 mol) was blended with TOFA (0.6 mol) at ambient temperature and then was stirred at 130° C. for 24 h, using a Heat-On™ block under Dean and Stark conditions. Analysis of the reaction product by $^1$H NMR showed that the product contained a mixture of bis-amide (3), 97%, and imidazoline-amide, 3%. Equal molar ratios of freshly prepared bis-amide (3) and anhydrous ammonium formate were further combined and heated in a Heat-On™ block at 130° C. for 1 h. Ammonia was removed under reduced pressure. $^1$H NMR spectra showed a characteristic proton associated with the N-formyl functionality at δ 7.93 ppm. The $^{13}$C NMR spectra showed three carbonyl signals, the signal at 173.3 ppm and 173.6 assigned to the amide of the fatty acid/DETA linkage, the signal at 163.7 ppm the N-formyl carbonyl.

The performance of formyl-amide (12) emulsifier was studied in a typical oil-based drilling fluid formulation (Table 1). Results in Table 7 show that fluid loss for formyl-amide (12) was significantly worse than the baseline or preferred emulsifiers.

TABLE 7

HPHT values for different synthesis temperatures

| Material/Steps (1/2/3) | Synthesis Step 3 Temperature, ° C. | HTHP AHR 325° F. Fluid Loss, ml |
|---|---|---|
| Baseline - Step 1(C)/2 only (I) | N/A | 7.5 |
| Preferred emulsifier - Steps 1(C)/2/3 | 160 | 2.8 |
| Formyl-amide (12) | N/A | 35 |

Example 7 (Embodiments)

The influence of the DETA:TOFA:MA ratio on the emulsifier composition and performance in a typical oil-based drilling fluid formulation. The emulsifier was prepared according to the method described in Examples 2 (step 1, method C) and 3. The purity of the bis-amide was monitored by $^1$H NMR spectroscopy: the first step intermediate with DETA:TOFA ratio of 1:1.8 was contaminated with imidazoline, 6.5%; and intermediate with DETA:TOFA ratio of 1:1.6 was contaminated with imidazoline, 3%. An intermediate formed at Step 1 was further reacted with maleic anhydride (Step 2) and then heated at 160° C. for 4 hrs (Step 3).

The performance of the emulsifier with DETA:TOFA ratios in a typical oil-based drilling fluid formulation are shown in Table 8.

TABLE 8

HPHT values for different DETA:TOFA:MA ratios

| DETA:TOFA:MA | Step 3 Heat Aging Conditions | HTHP AHR 325° F. Fluid Loss, ml | HTHP ASA 7 d Fluid Loss, ml | 10 min gel at 40° F. lb/100 ft$^2$ | 10 min gel at 150° F., lb/100 ft$^2$ |
|---|---|---|---|---|---|
| 1:2:1 | 4 h @ 160° C. | 3.4 | 1 | 25 | 35 |
| 1:1.6:1 | 4 h @ 160° C. | 2 | 45 | 16 | 45 |
| 1:1.8:1 | 4 h @ 160° C. | 3 | 38 | 18 | 39 |

Results showed that after hot roll all were similar but after extended static aging the emulsifier with 1:2:1 DETA:TOFA:MA ratio outperformed the other two. Also, from Table 8 it follows that as the ratio of DETA:TOFA slips further from stoichiometric, the long-term stability of the emulsion worsens, i.e. 1:1.6 was not as good as 1:1.8.

Example 8 (Comparative)

Performance of bis-amide and imidazoline in a typical oil-based drilling fluid formulation. Table 9 shows that bis-amide and imidazoline, which are intermediates prior to addition of maleic anhydride, are not effective emulsifiers. Two samples were analyzed: bis-amide, contained 97% of bis-amide synthesized by method C-2 (Example 2-1), and imidazoline synthesized by method B (Example 2-1) and contained 75% of imidazoline. The performance of emulsifiers was studied in a typical oil-based drilling fluid formulation (Table 1). Fluid loss after hot roll was substantially higher than the baseline and there was water in the filtrate for both samples, which indicated emulsion instability.

TABLE 9

Performance of bis-amide, imidazoline and formyl-amide

| Material | HTHP AHR 325° F. Fluid Loss, ml |
|---|---|
| Baseline - Steps 1(C)/2 only (I) | 7.5 |
| Bis-amide | 24 |
| Formyl-amide (III) | 34 |

Example 9 (Embodiments and Comparative)

Analysis of the reaction product of dibutyl amine (9a) and maleic and fumaric acids and the thermal decomposition mechanism. The reaction product of dibutyl amine (9a) and maleic and fumaric acids was investigated. Scheme 8 shows the mechanism of reaction of maleic (and fumaric) acid with secondary amine.

Scheme 8

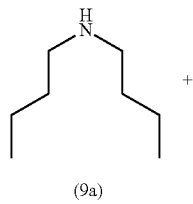

(9a)

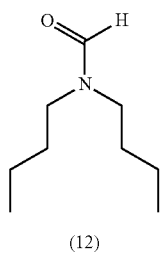

(12)

Maleic acid or fumaric acid powder (0.9 eq.) was added to dibutylamine (9a) (1 eq.) at ambient temperature. A solid powder was formed as the result of salt formation between dibutylamine and acid. The reactor was heated at 160° C. for 6 h and a syrupy dark reddish-brown mass was formed. The composition of the reaction product was analyzed by NMR spectroscopy without purification. Table 10 shows the characteristic $^1$H NMR chemical shifts used to identify the composition of reaction.

TABLE 10

Characteristic $^1$H NMR chemical shifts (in benzene-$d_6$) of reaction dibutylamine (9a) with maleic acid, fumaric acid and maleic anhydride heated at 160° C. for 6 h.

| Sample | Compound (10), δ (ppm) | Compound (11), δ (ppm) | Compound (12), δ (ppm) |
|---|---|---|---|
| 9a + maleic acid | 6.17 (d, J = 12.9 Hz) | 7.55 (d, J = 15.1 Hz) | 7.82 (s) |
| | 5.75 (d, J = 12.8 Hz) | 7.40 (d, J = 15.2 Hz) | |
| 9a + fumaric acid | 6.15 (d, J = 12.9 Hz) | 7.53 (d, J = 15.2 Hz) | 7.83 (s) |
| | 5.68 (d, J = 12.9 Hz) | 7.35 (d, J = 15.2 Hz) | |
| 9a + maleic anhydride | 6.18 (d, J = 12.7 Hz) | 7.54 (d, J = 15.1 Hz) | 7.79 (s) |
| | 5.98 (d, J = 12.7 Hz) | 7.36 (d, J = 15.1 Hz) | |

-continued

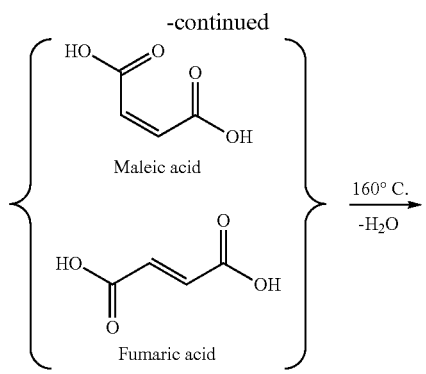

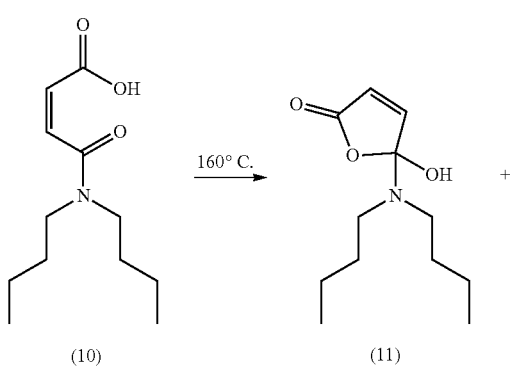

(10)     (11)

The reaction product formed at 160° C. for 6 h was a blend of compounds (10), (11) and (12) (Scheme 8) of different ratios. The presence of two doublets at δ −6.15-6.17 ppm and −5.68-5.98 ppm with a $J_{HH}$ of ~12.7-12.9 Hz indicated the formation of the maleimic acid derivative (10). Compound (11) was confirmed by the presence of two doublets in the $^1$H NMR spectrum at δ 7.53-7.55 ppm and 7.53-7.55 ppm with a $J_{HH}$ of 15.1-15.2 Hz and a broad signal at δ −9-11 ppm, corresponding to —OH group. Formation of the product (12) was confirmed by the presence of singlet at δ 7.79-7.83 ppm.

Thus, this example shows that the acid-substitution and isomerization reaction mechanisms between amine and maleic anhydride, maleic acid, its isomer, fumaric acid, were identical.

Example 10 (Embodiments)

The effect of coupling agents on the performance of thermally aged emulsifiers in a typical oil-based drilling fluid formulation. A series of emulsifiers was prepared according to the method described in Example 3 (steps 1(C)/2/3), but the coupling agents, including maleic acid, fumaric acid and maleic anhydride, and conditions for Step 3 were changed. The performance of emulsifiers was studied in a typical oil-based drilling fluid formulation (Table 1), and the results are presented in Table 11.

TABLE 11

Characteristics of emulsifiers based on reaction of the bis-amide with maleic acid, fumaric acid and maleic anhydride.

| Emulsifier Coupling Agent | Step 3 Heat Aging Conditions | HTHP AHR 325° F. Fluid Loss, ml | FANN35 6 rpm AHR 150° F. | 10 min gel at 40° F. lb/100 ft2 |
|---|---|---|---|---|
| Maleic acid | 3 h @ 130° C. and 3 h @ 170° C. | 4 | 12 | 37 |
| Fumaric acid | 2 h @ 130° C. and 2 h @ 170° C. | 2.6 | 16 | 58 |
| Maleic anhydride | 4 h @ 160° C. | 2.8 | 8 | 27 |

As shown in Table 11, similar behaviors were found for all emulsifier compositions.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. An emulsifier composition, comprising:
   an iso-amidoamine prepared by a process comprising the steps of:
   (1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof, to form a first reaction product comprising a polyalkyleneamidoamine derivative of the polyalkyleneamine;
   (2) reacting the first reaction product from step (1) with a dicarboxylic acid selected from maleic acid, fumaric acid, maleic anhydride, and combinations thereof to form a second reaction product an acid-substituted amidoamine; and
   (3) heat treating the maleated amidoamine from step (2) at a temperature and for a time sufficient to form a heat treatment product comprising an isomer of the acid-substituted amidoamine, wherein the heat treatment product has an acid number less than an acid number of the second reaction product;
   about 30-80 wt % of the heat treatment product from step (3); and
   about 70-20 wt % of one or more other components,
   wherein the one or more other components comprise a hydrocarbyl ethoxylate having the formula RO—(CH$_2$CH$_2$O)$_n$H wherein R is a C$_{5-22}$ (C$_{16-22}$) hydrocarbyl group and n is an integer in the range of 2 to 30.

2. The emulsifier composition of claim 1, wherein the polyalkyleneamine has the formula:

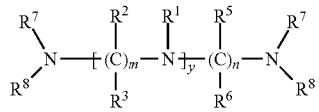

where R$^1$, R$^7$, and R$^8$ are hydrogen; R$^2$, R$^3$, R$^5$, and R$^6$ are each independently selected from H, C$_1$ to C$_4$ alkyl, C$_1$ to C$_4$ alkoxyalkyl, and C$_1$ to C$_4$ hydroxyalkyl; n and m are an integers from 1 to 10; and y is an integer from 1 to 5;
wherein the monocarboxylic acid is tall oil fatty acid (TOFA), stearic acid, isostearic acid, or a combination thereof, and the dicarboxylic acid is maleic anhydride.

3. The emulsifier composition of claim 1, wherein the polyalkyleneamidoamine derivative from step (1) has the formula:

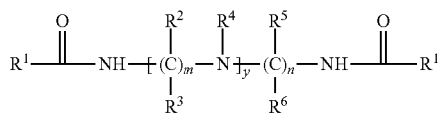

where each R$^1$ is a C$_4$ to C$_{30}$ hydrocarbyl; R$^2$, R$^3$, R$^5$, and R$^6$ are each independently selected from H, C$_1$ to C$_4$ alkyl, C$_1$ to C$_4$ alkoxyalkyl, and C$_1$ to C$_4$ hydroxyalkyl; R$^4$ is hydrogen; n and m are independently integers from 1 to 10; and y is an integer from 1 to 5.

4. The emulsifier composition of claim 1, wherein step (1) comprises contacting the polyalkyleneamine and the monocarboxylic acid at approximately 110-140° C. in a closed reactor, to control removal of water formed from amide condensation, and to control imidazoline formation to less than 30%, based on the total moles of the polyalkyleneamine, the polyalkyleneamidoamine derivative, and the imidazoline in the first reaction product.

5. The emulsifier composition of claim 1, wherein a reaction mixture in step (1) comprises a molar ratio of the polyalkyleneamine and the monocarboxylic acid from 1:1.2 to 1:2.8.

6. The emulsifier composition of claim 1, wherein the acid-substituted amidoamine from step (2) is a compound (I) according to the formula:

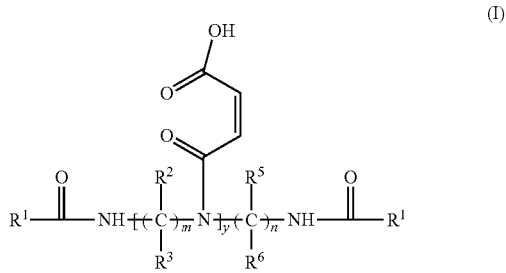

where each R$^1$ is a C4 to C30 hydrocarbyl; R$^2$, R$^3$, R$^5$, and R$^6$ are each independently selected from H, C$_1$ to C$_4$ alkyl, C$_1$ to C$_4$ alkoxyalkyl, and C$_1$ to C$_4$ hydroxyalkyl; m and n are integers from 1 to 10; and y is an integer from 1 to 5.

7. The emulsifier composition of claim 1, wherein step (2) comprises contacting the first reaction product and the dicarboxylic acid at approximately 70-100° C., for about 0.5-2 h, wherein a molar ratio of the polyalkyleneamidoamine derivative and the dicarboxylic acid is from 1:0.8 to 1:1.2.

8. The emulsifier composition of claim 1, wherein the heat treatment in step (3) is conducted at a temperature above 140° C. and/or for a period of time greater than 2 hours.

9. The emulsifier composition of claim 1, wherein the heat treatment product of step (3) is controlled for an acid number less than 35 mg KOH/gram, an amine number less than 10 mg KOH/gram, and a viscosity of less than 800 centipoise at 50° C. when measured at a dilution of 50 wt % in an IO1618 base oil.

10. An invert drilling fluid, comprising:
    (a) an oleaginous external phase;
    (b) a non-oleaginous internal phase;
    (c) the emulsifier composition of claim 1;
    (d) optionally one or more rheology additives; and
    (e) optionally one or more wetting additives.

11. The invert drilling fluid of claim 10, further comprising a wetting additive comprising a hydrocarbyl ethoxylate having the formula RO—(CH$_2$CH$_2$O)$_n$H wherein R is a C$_{5\text{-}22}$ hydrocarbyl group and n is an integer in the range of 2 to 30.

12. A process for preparing an invert wellbore fluid, comprising the steps of:
    (A) making an emulsifier composition, comprising the steps of:
        (1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof, to form a first reaction product comprising a polyalkyleneamidoamine derivative of the polyalkyleneamine;
        (2) reacting the first reaction product from step (1) with a dicarboxylic acid selected from maleic acid, fumaric acid, maleic anhydride, and combinations thereof to form a second reaction product an acid-substituted amidoamine; and
        (3) heat treating the maleated amidoamine from step (2) at a temperature and for a time sufficient to form a heat treatment product comprising an isomer of the acid-substituted amidoamine, wherein the heat treatment product has an acid number less than an acid number of the second reaction product,
    wherein the heat treatment product from step (3) comprises iso-amidoamine compound (II) or a mixture of iso-amidoamine compound (II) with acid-substituted amidoamine compound (I) and/or formyl-substituted amidoamine compound (III), according to the formulae:

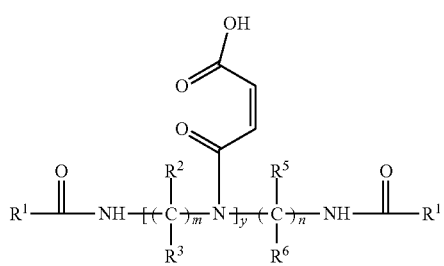

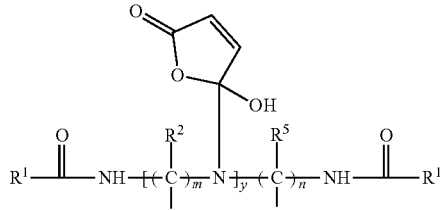

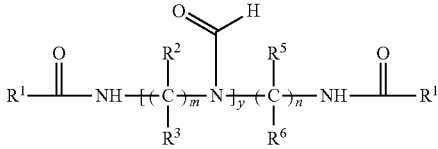

wherein each R$^1$ is a C$_4$ to C$_{30}$ hydrocarbyl; R$^2$, R$^3$, R$^5$, and R$^6$ are each independently selected from H, C to C4 alkyl, C$_1$ to C$_4$ alkoxyalkyl, and C$_1$ to C$_4$ hydroxyalkyl; n and m are independently integers from 1 to 10; and y is an integer from 1 to 5; and wherein molar proportions of compounds (I), (II), and (III), are optionally 0-90:10-100:0-60 based on the total moles of compounds (I), (II), and (III), present in the emulsifier composition; and (B) formulating the emulsifier composition in an emulsifying amount in an invert wellbore fluid further comprising an oleaginous external phase, a non-oleaginous internal phase, one or more rheology additives, and one or more wetting additives, wherein the one or more wetting additives comprise a hydrocarbyl ethoxylate having the formula RO—(CH$_2$CH$_2$O)$_n$H wherein R is a C$_{5\text{-}22}$ hydrocarbyl group and n is an integer in the range of 2 to 30.

13. The process of claim 12, wherein the polyalkyleneamine has the formula

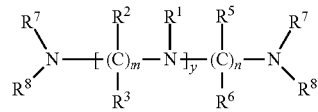

where R$^1$, R$^7$, and R$^8$ are hydrogen; R$^2$, R$^3$, R$^5$, and R$^6$ are each independently selected from H, C$_1$ to C$_4$ alkyl, C$_1$ to C$_4$ alkoxyalkyl, and C$_1$ to C$_4$ hydroxyalkyl; n and m are an integers from 1 to 10; and y is an integer from 1 to 5;

wherein the monocarboxylic acid is tall oil fatty acid (TOFA), stearic acid, isostearic acid, or a combination thereof, and the dicarboxylic acid is maleic anhydride.

14. The process of claim 12, wherein the polyalkyleneamidoamine derivative from step (1) has the formula:

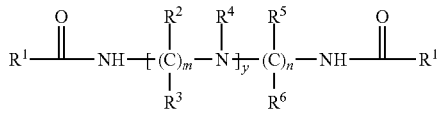

where each R$^1$ is a C$_4$ to C$_{30}$ hydrocarbyl; R$^2$, R$^3$, R$^5$, and R$^6$ are each independently selected from H, C$_1$ to C$_4$ alkyl, C$_1$ to C$_4$ alkoxyalkyl, and C$_1$ to C$_4$ hydroxyalkyl;

$R^4$ is hydrogen; n and m are independently integers from 1 to 10; and y is an integer from 1 to 5.

15. The process of claim 12, wherein step (1) comprises contacting the polyalkyleneamine and the monocarboxylic acid at approximately 110-140° C. in a closed reactor, to control removal of water formed from amide condensation, and to control imidazoline formation to less than 30%, based on the total moles of the polyalkyleneamine, the polyalkyleneamidoamine derivative, and the imidazoline in the first reaction product.

16. The process of claim 12, wherein a reaction mixture in step (1) comprises a molar ratio of the polyalkyleneamine and the monocarboxylic acid from 1:1.2 to 1:2.8.

17. The process of claim 12, wherein the acid-substituted amidoamine from step (2) is a compound (I) according to the formula:

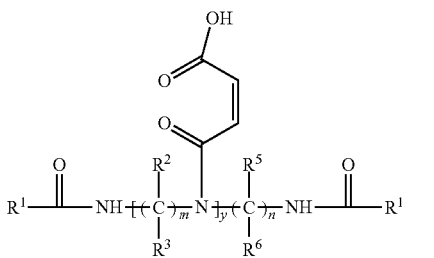

(I)

where each $R^1$ is a $C_4$ to $C_{30}$ hydrocarbyl; $R^2$, $R^3$, $R^5$, and $R^6$ are each independently selected from H, $C_1$ to $C_4$ alkyl, $C_1$ to $C_4$ alkoxyalkyl, and $C_1$ to $C_4$ hydroxyalkyl; m and n are integers from 1 to 10; and y is an integer from 1 to 5.

18. The process of claim 12, wherein step (2) comprises contacting the first reaction product and the dicarboxylic acid at approximately 70-100° C., for about 0.5-2 h, wherein a molar ratio of the polyalkyleneamidoamine derivative and the dicarboxylic acid is from 1:0.8 to 1:1.2.

19. The process of claim 12, wherein the heat treatment in step (3) is conducted at a temperature above 140° C. and/or for a period of time greater than 2 hours.

20. The process of claim 12, further comprising the step of:
(C) circulating the invert wellbore fluid from step (B) in a wellbore.

21. The process of claim 20, further comprising the step of:
(D) drilling the well while circulating the invert wellbore fluid in step (C).

22. A process for drilling a well, comprising the steps of:
(a) formulating an invert wellbore fluid comprising an oleaginous external phase, a non-oleaginous internal phase, an emulsifier composition according to claim 1, one or more rheology additives, and one or more wetting additives;
(b) circulating the invert wellbore fluid from step (a) in a wellbore; and
(c) drilling the well while circulating the invert wellbore fluid in step (b).

23. The process of claim 22, wherein the one or more wetting additives comprise a hydrocarbyl ethoxylate having the formula $RO-(CH_2CH_2O)_nH$ wherein R is a $C_{5-22}$ hydrocarbyl group and n is an integer in the range of 2 to 30.

24. A process for making an emulsifier composition, comprising the steps of:
(1) reacting a polyalkyleneamine having from 4 to 30 carbon atoms, at least one secondary amine group, and at least two primary amine groups, with a monocarboxylic acid having from 4 to 30 carbon atoms or an acyl halide or hydrocarbyl ester thereof, to form a first reaction product comprising a polyalkyleneamidoamine derivative of the polyalkyleneamine;
(2) reacting the first reaction product from step (1) with a dicarboxylic acid selected from maleic acid, fumaric acid, maleic anhydride, and combinations thereof to form a second reaction product an acid-substituted amidoamine; and
(3) heat treating the maleated amidoamine from step (2) at a temperature and for a time sufficient to form a heat treatment product comprising an isomer of the acid-substituted amidoamine, wherein the heat treatment product has an acid number less than an acid number of the second reaction product,
wherein the heat treatment in step (3) is controlled wherein the heat treatment product has an acid number less than 35 mg KOH/gram, an amine number less than 10 mg KOH/gram, and a viscosity of less than 800 centipoise at 50° C. when measured at a dilution of 50 wt % in an IO1618 base oil.

* * * * *